June 17, 1958 J. W. HAANSTRA 2,839,740

ANALOG-TO-DIGITAL CONVERTER

Filed Jan. 27, 1954 9 Sheets-Sheet 1

INVENTOR.
JOHN WILSON HAANSTRA
BY
Campbell, Brumbaugh, Free & Graves
HIS ATTORNEYS.

INVENTOR.
JOHN WILSON HAANSTRA
BY
Campbell, Brumbaugh, Free & Graves
HIS ATTORNEYS.

ANALOG-TO-DIGITAL CONVERTER

Filed Jan. 27, 1954 9 Sheets-Sheet 3

INVENTOR.
JOHN WILSON HAANSTRA
BY
Campbell, Brumbaugh, Free & Graves
HIS ATTORNEYS.

June 17, 1958 J. W. HAANSTRA 2,839,740

ANALOG-TO-DIGITAL CONVERTER

Filed Jan. 27, 1954 9 Sheets-Sheet 4

INVENTOR.
JOHN WILSON HAANSTRA
BY
Campbell, Brumbaugh, Free & Graves
HIS ATTORNEYS.

INVENTOR.
JOHN WILSON HAANSTRA
BY
Campbell, Brumbaugh, Free & Graves
HIS ATTORNEYS.

June 17, 1958 J. W. HAANSTRA 2,839,740

ANALOG-TO-DIGITAL CONVERTER

Filed Jan. 27, 1954 9 Sheets-Sheet 6

INVENTOR.
JOHN WILSON HAANSTRA
BY
Campbell, Brumbaugh, Free & Graves
HIS ATTORNEYS.

June 17, 1958 J. W. HAANSTRA 2,839,740

ANALOG-TO-DIGITAL CONVERTER

Filed Jan. 27, 1954 9 Sheets-Sheet 7

INVENTOR.
JOHN WILSON HAANSTRA
BY
Campbell, Brumbaugh, Free & Graves
HIS ATTORNEYS.

INVENTOR.
JOHN WILSON HAANSTRA
BY
Campbell, Brumbaugh, Free & Graves
HIS ATTORNEYS.

June 17, 1958 J. W. HAANSTRA 2,839,740

ANALOG-TO-DIGITAL CONVERTER

Filed Jan. 27, 1954 9 Sheets-Sheet 9

INVENTOR.
JOHN WILSON HAANSTRA
BY
Campbell, Brumbaugh, Free & Graves
HIS ATTORNEYS.

United States Patent Office 2,839,740

Patented June 17, 1958

2,839,740

ANALOG-TO-DIGITAL CONVERTER

John Wilson Haanstra, San Jose, Calif., assignor to International Business Machines Corporation, New York, N. Y., a corporation of New York Application January 27, 1954, Serial No. 406,435

20 Claims. (Cl. 340—204)

This invention relates to analog-to-digital converters, and more particularly to such converters in which the analog quantity comprises relatively small voltages, as for example, the output of a strain gauge.

It is a principal object of the present invention to provide digital manifestation of a variable quantity with a high degree of linearity, simplicity, accuracy and reproducibility.

Another object of the present invention is the provision of digital manifestation of a variable quantity without appreciably loading the voltage source.

An additional object of the present invention is to provide, in an analog-to-digital converter a source of stepped voltage utilizing an improved translator circuit arrangement.

In accordance with the present invention, there is provided an analog-to-digital converter which comprises a combination of components including a source of unknown voltage representing an unknown variable quantity, a source of stepped comparison voltage, and a source of alternating voltage. Means are provided for comparing the unknown and stepped voltages to provide a difference voltage, and for modulating the alternating voltage with the difference voltage. There are also provided means for synchronously rectifying the modulated voltage and means actuated when the rectified modulated voltage has a given polarity for controlling the source of stepped voltage. Additional means associated with the source of stepped voltage are provided for manifesting digital values corresponding to the value of the variable voltage.

In accordance with an additional feature of the present invention, there is provided a translator circuit arrangement especially adapted for use in an analog-to-digital converter which comprises the combination of a source of potential, a plurality of impedance elements connected in a voltage proportioning network, a pair of output terminals connected across a first of these impedance elements, and means for selectively connecting the potential source in circuit with one or more of the remaining impedance elements.

Other objects and features of the invention will be pointed out in the following description and claims and illustrated on the accompanying drawings, which disclose, by way of example, the principle of the invention and the best mode which has been contemplated, of applying that principle.

In the drawings, in which like components are designated by like reference numerals:

Figure 1:
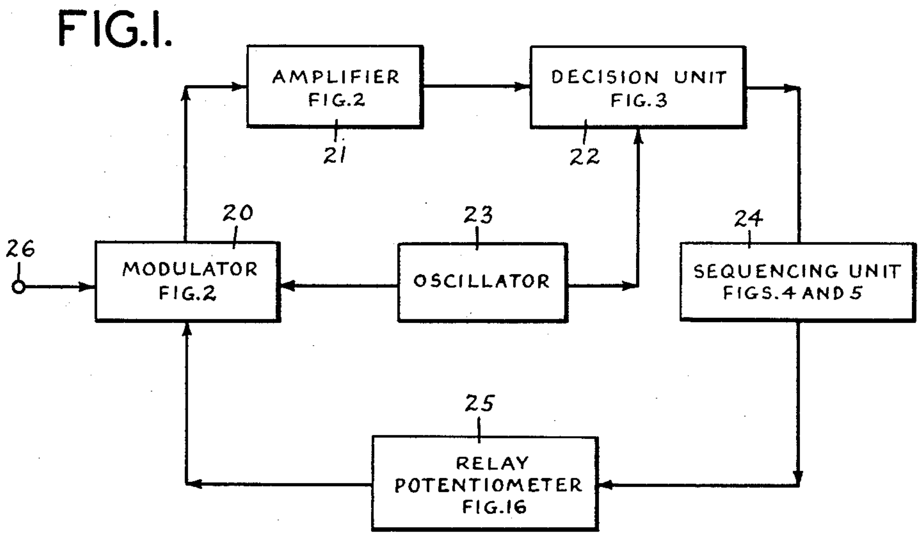
Fig. 1 is a block diagram of an analog-to-digital converter in accordance with the present invention.
Figure 4:
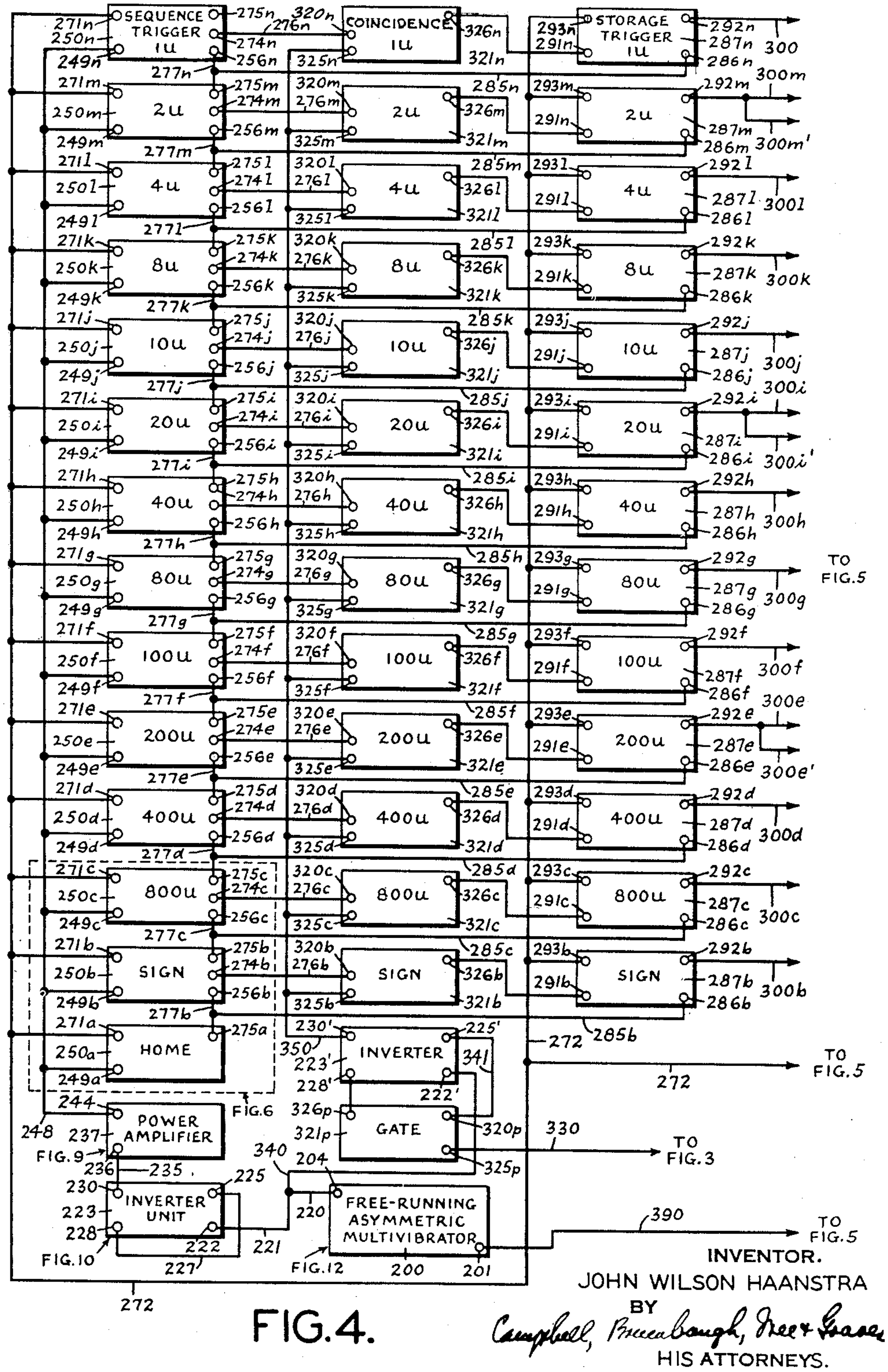
Figure 5:
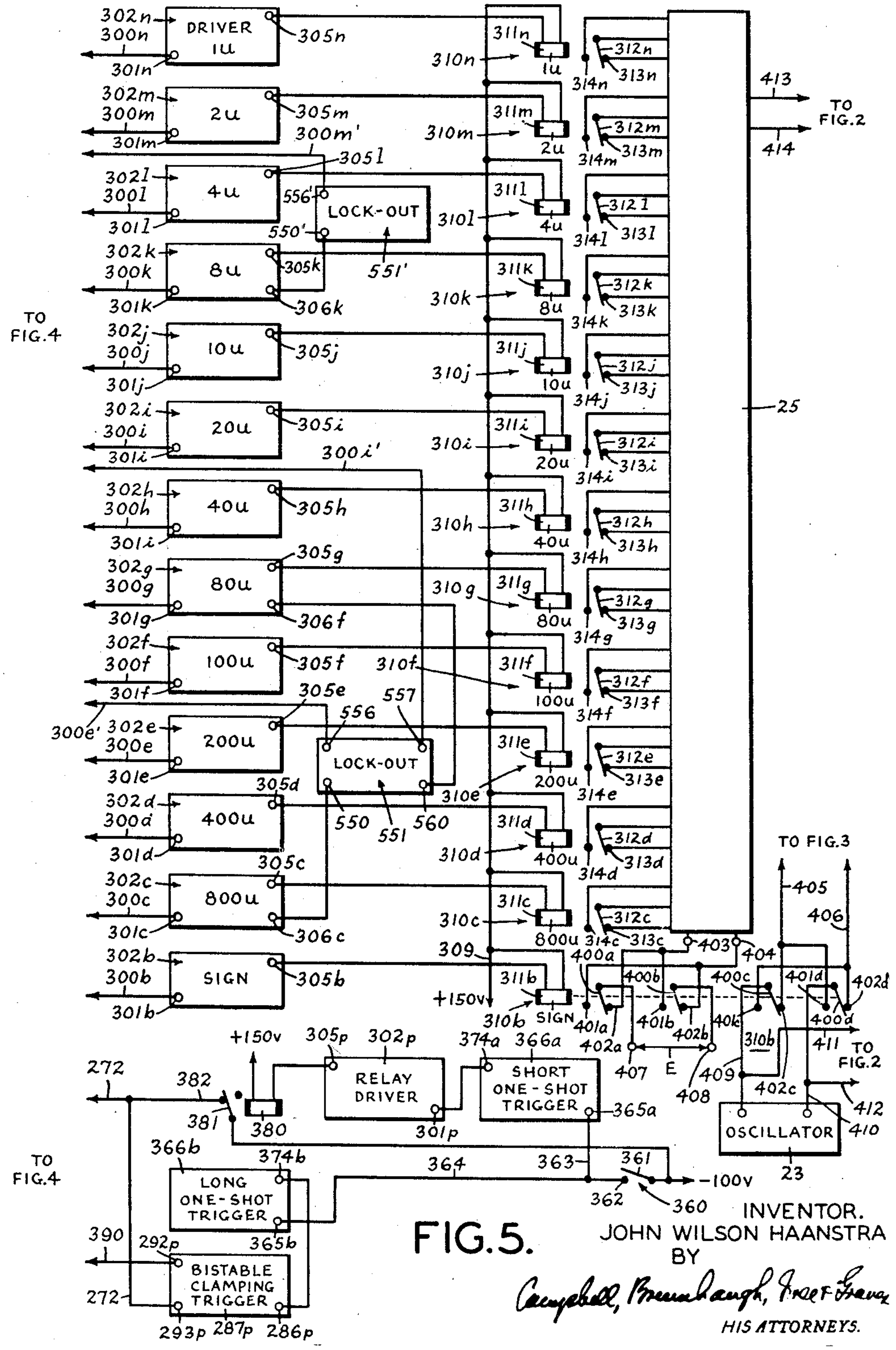
Figure 16:
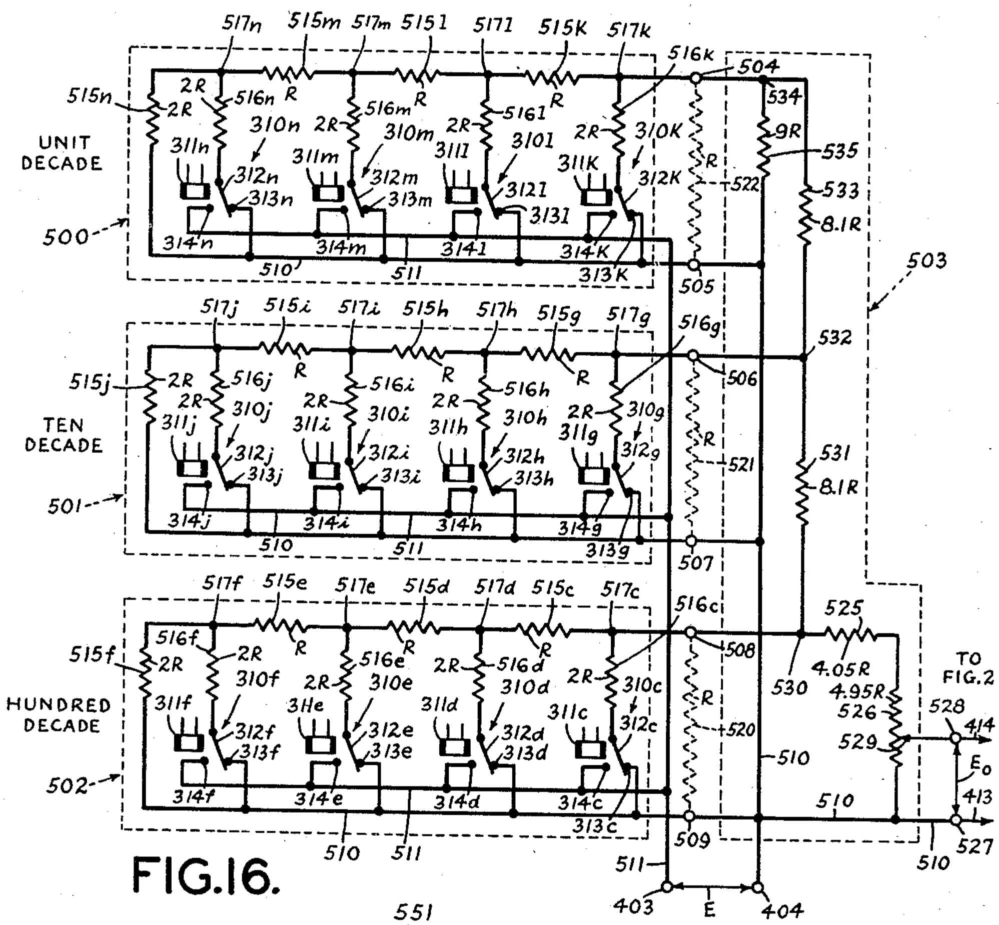

Figs. 4 and 5 together comprise a block diagram of the sequencing unit of the converter of Fig. 1;

Figs. 6–15 are schematic circuit diagrams of various elements comprising the sequencing unit of Figs. 4 and 5;

Fig. 16 is a schematic diagram of the relay potentiometer unit of Fig. 1; and

Figure 17:
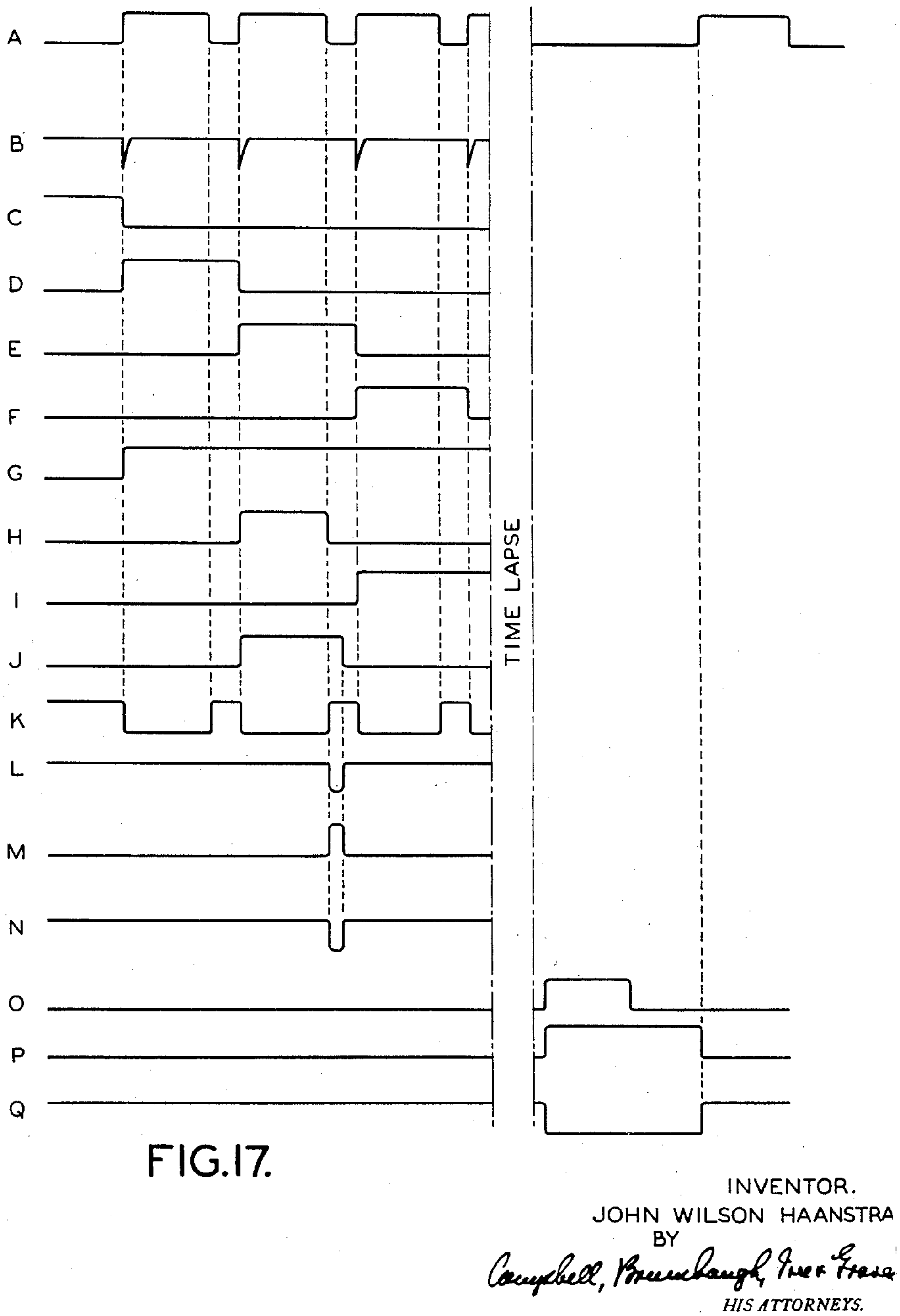

Fig. 17 represents a set of waveform diagrams of aid in explaining the operation of the system.

In the figures it will be understood that a shaded intrrior of an electron tube indicates that, unless otherwise noted, the tube is conducting at the start of a measuring cycle.

The converter of Fig. 1 comprises a modulator unit 20, an amplifier unit 21, a decision unit 22, and oscillator unit 23, a sequencing unit 24 and a relay potentiometer unit 25. The input or analog voltage to be measured is applied to input terminal 26, which thus constitutes a source of the analog voltage. This analog voltage is compared, in modulator unit 20, with the stepped comparison voltage produced by relay potentiometer unit 25 to provide a difference voltage. This difference voltage is utilized to modulate the alternating voltage produced by oscillator unit 23, the latter voltage preferably having a substantially sinusoidal waveform. The modulated alternating voltage is amplified by amplifier unit 21 and supplied to decision unit 22 in which it is synchronously rectified, the output of oscillator unit 23 also being supplied to decision unit 22 for this purpose.

This synchronous rectification results in a direct current voltage the polarity of which depends upon the sense of the original difference voltage between the unknown voltage at input teminal 26 and the stepped voltage produced by relay potentiometer unit 25. The direct current voltage is utilized in decision unit 22 to provide an output pulse when the voltage at input terminal 26 is exceeded by the stepped voltage from relay potentiometer unit 25. These output pulses are supplied to sequencing unit 24 which in turn controls relay potentiometer unit 25. Starting with the relay in unit 25 which provides the greatest output voltage, each relay is closed in turn by the action of sequencing unit 24. After each relay is closed, the output of decision unit 22 is checked or sampled. If it indicates that the voltage at input terminal 26 has been exceeded by the stepped voltage from relay potentiometer unit 25, that relay opens. The sequencing rate is controlled by a free-running multivibrator which is also utilized to control the sampling by decision unit 22 as each relay in turn is closed. When all the relays have been run through, the digital value of the voltage measured is manifested by the condition of the relays in relay potentiometer unit 25 which is thus a register means.

*The modulator and amplifier units*

Figure 2:
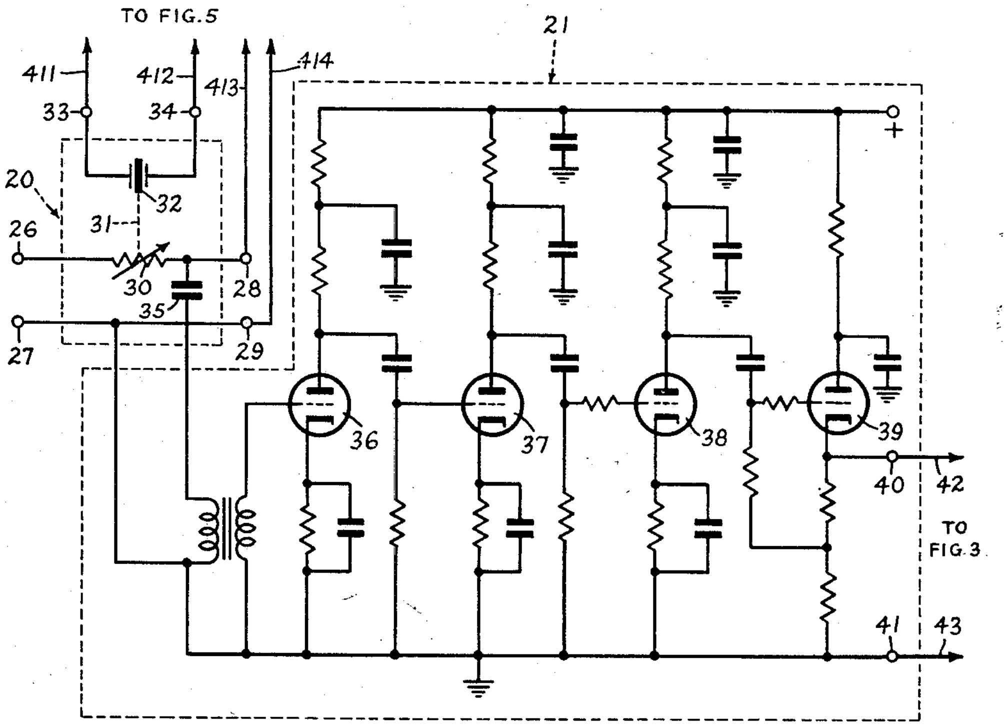
Fig. 2 is a schematic circuit diagram of the modulator and amplifier units of the converter of Fig. 1.

Fig. 2 is a schematic circuit diagram of modulator unit 20 and amplifier unit 21 of Fig. 1. Modulator unit 20 has a pair of input terminals 26 and 27, between which is applied the voltage to be measured. The stepped voltage from relay potentiometer unit 25 (Figs. 1 and 16) is applied between terminals 28 and 29. Connected between terminals 26 and 28 is a variable resistance device 30, preferably comprising a carbon-button microphone. As indicated by broken line 31, device 30 is actuated by a piezo electric element 32, which in turn is energized by the output of oscillator unit 23 (Figs. 1 and 5) applied between terminals 33 and 34. Oscillator 23 may provide an alternating signal output having a frequency on the order of 3000 C. P. S. The output of modulator unit 20, taken through a capacitor 35, comprises a sine wave which is approximately proportional in magnitude to the magnitude of the current flowing through device 30. This sine wave is either in phase with or in phase opposition to the output of oscillator unit 23, depending upon the direction of current flowing through device 30. It will be apparent, therefore, that the phase of the output wave from modulator unit 20 will provide a positive indication as to whether or not the voltage to be measured as applied between terminals 26 and 27 exceeds the stepped voltage applied between terminals 28 and 29.

The output of modulator unit 20 is amplified by amplifier unit 21, which is of conventional design and comprises a plurality of cascaded amplifier tubes 36, 37 and 38 and a cathode follower 39. The amplifier output wave is developed between output terminals 40 and 41, and supplied via leads 42 and 43 to the decision unit 22 (Fig. 3).

The polarity of the difference signal obtained by modulator 20 thus cooperates with an alternating signal to modify a time characteristic thereof (e. g., phase) which is substantially unaffected by operating parameter variations in the amplifier unit. Accordingly, there may be obtained an accurate amplified measure of the polarity of an original small order D. C. signal.

*The decision unit*

Figure 3:
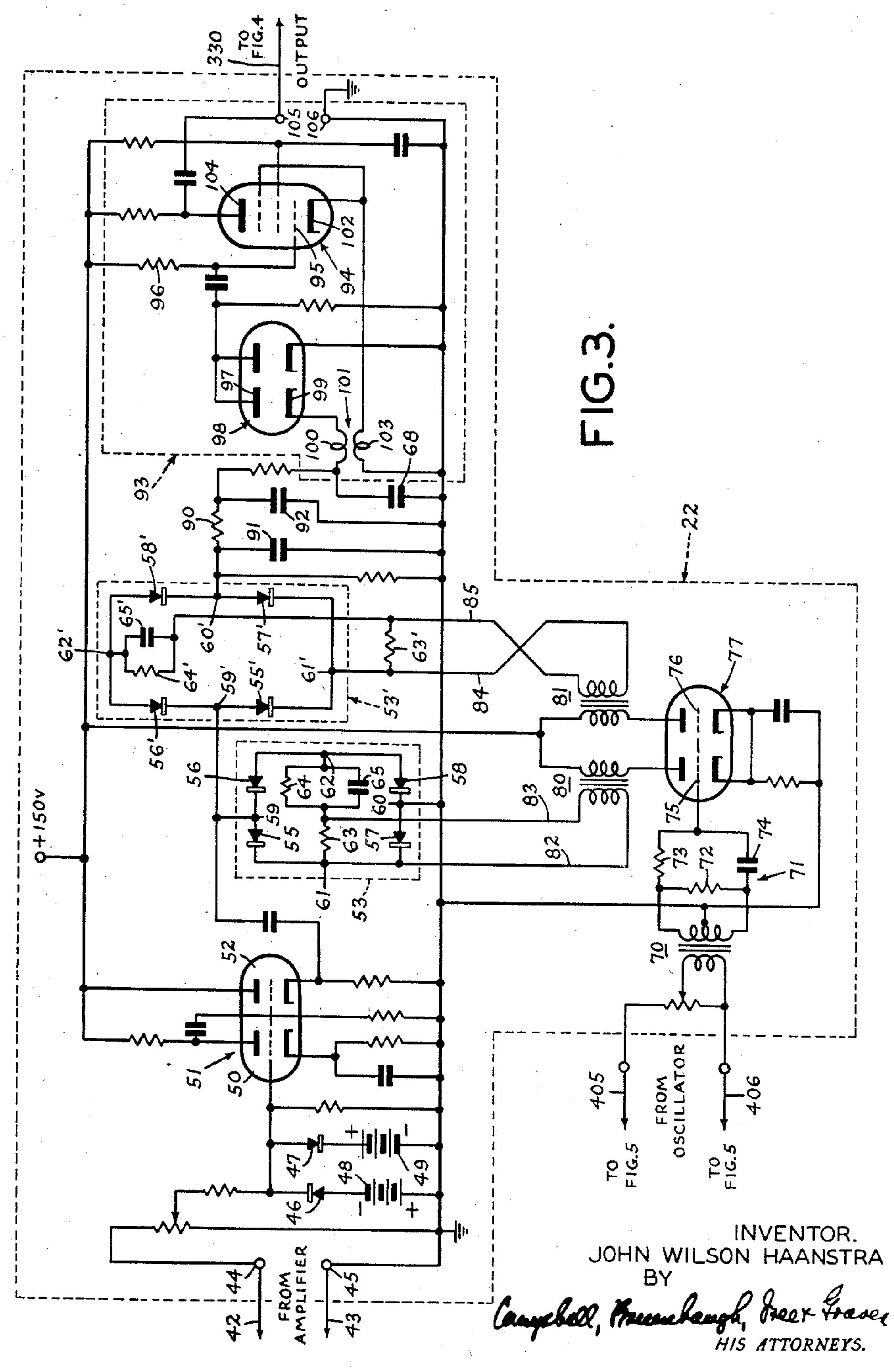
Fig. 3 is a schematic circuit diagram of the decision unit of the converter of Fig. 1.

Referring now to Fig. 3, the amplified signal on leads 42, 43 is applied via input terminals 44, 45 and a conventional input circuit across a pair of rectifier elements 46, 47 connected in reverse parallel relation. The rectifiers 46, 47 include in their current paths two respective fixed potentials, as represented by the batteries 48, 49, which potentials have reverse parallel polarities so that each potential opposes the flow of current through its associated rectifier. Thus, if, but only if, the amplified signal exceeds in either positive or negative direction, the values established by the fixed potentials, one or the other of the rectifiers 46, 47 will draw current to clip the amplified signal.

Figure 14:
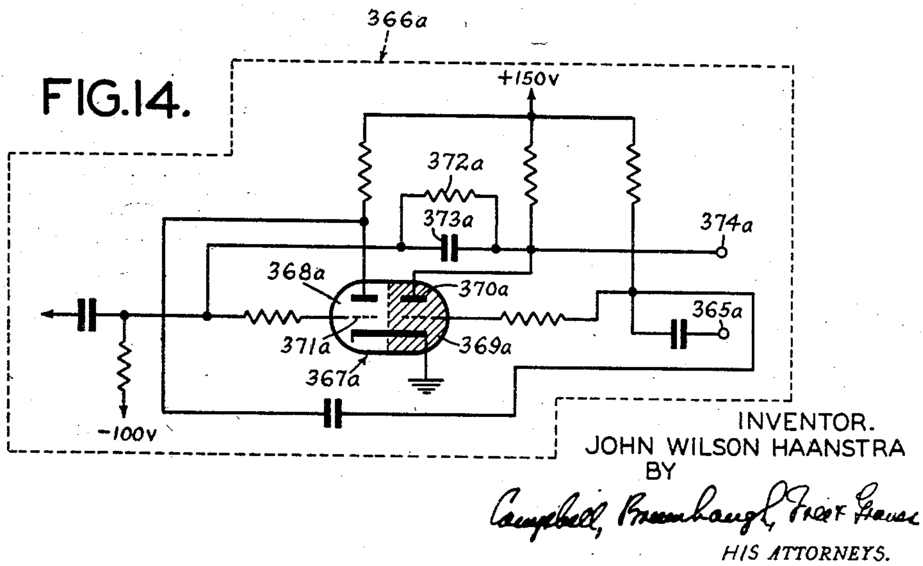

From the clipper rectifiers 46, 47 the amplified signal is transferred through a conventional amplifier stage afforded by the left-hand section 50 of a dual triode 51, a cathode follower stage afforded by the right-hand section 52 of this dual triode, and from thence to the first of a pair of synchronous rectifier circuits 53, 53′ similar to the switching type demodulator circuit shown in Fig. 14.24 and discussed in section 14.5 of "Waveforms," vol. 19 of the M. I. T. Radiation Laboratory Series (published by McGraw-Hill, 1949.

Considering rectifier circuit 53 which is typical, the circuit comprises four rectifying "diodes" 55, 56, 57, 58 which form the four arms of a bridge and which are oriented for current passage so that diodes 55, 56 are paired in series to have the same current direction and diodes 57, 58 are paired in series to have the same current direction, but the two series combinations of paired diodes are coupled to have opposite current directions around the bridge. The amplified signal is applied with regard to synchronous rectifier 53 between the branch points 59 and 60, of which the former is disposed between diodes 55 and 56 and the latter is disposed between diodes 57 and 58. Branch point 60 is also connected to ground.

Conjugate with branch points 59 and 60 are another pair of branch points 61, 62 respectively disposed between the diodes 55, 57 and between the diodes 56, 58. Between branch points 61, 62 there is connected a branch including a resistor 63 in series with the parallel combination of a resistor 64 and a capacitor 65.

The description so far given for synchronous rectifier 53 also applies essentially to synchronous rectifier 53′ with the exception that in this latter synchronous rectifier the branch point 60′, instead of being directly connected to ground, is connected to ground through a filter circuit to be later described.

Each of the synchronous rectifier circuits is adapted to receive an additional input from a circuit shown in the lower part of Fig. 3. Considering this circuit, the alternating signal from oscillator 23 (Fig. 5) is impressed via a coupling transformer 70 and a phase shifting circuit 71 (including resistors 72, 73 and capacitor 74) upon the tied-together, left-hand and right-hand grids 75, 76 of a dual triode 77. Both triode sections are connected to operate as amplifier stages, the anode loads for the two stages being provided, respectively, by a left-hand output transformer 80 and a right-hand output transformer 81. The oscillator input signal to dual triode 77 thus appears as output signals of transformers 80, 81, these output signals being appropriately phased by the phase shift circuit 71 to compensate for any phase change undergone by the aforementioned amplified signal in the course of its progress to the synchronous rectifiers 53 and 53′. Thus, with regard to the synchronous rectifiers, the amplified signal and the oscillator signal are harmonized to be of either the same or opposite phase, with the magnitude of the oscillator signal being considerably greater than that of the amplified signal.

The output of transformer 80 is applied via leads 82, 83 across resistor 63 in synchronous rectifier circuit 53. The output of transformer 81 is applied via leads 84, 85 across resistor 63′ of synchronous rectifier 53′ in such polarity relation that the oscillator signal seen by resistor 63′ is of opposite phase to the oscillator signal seen by resistor 63.

In the discussion immediately to follow, it will be assumed that the normal situation exists where at modulator 20 (Fig. 1) a positive voltage to be measured is compared with a positive comparison voltage. It will also be assumed under such conditions that with the comparison voltage less than the measured voltage, the amplified alternating signal between branch points 59 and 60 has instantaneous negative and positive polarities for, respectively, the first and second half periods of a signal cycle. Of course, if the comparison voltage exceeds the measured voltage, the amplified signal reverses its instantaneous polarities for these two half periods.

Considering the operation of synchronous rectifier 53, the oscillator signal across resistor 63 will be, say, for the first half period of a signal cycle, of a polarity establishing current flow through the path including resistor 64 and capacitor 65 in parallel, branch point 62, the several diodes 55–58, and back to branch point 61. Obviously, during the second half period of a signal cycle, no oscillator signal current will flow through this path for the reason that the orientation of the diodes opposes current flow for the signal polarity existing during the second half period.

The synchronous rectifier 53′ operates in a similar manner with the exception that since the oscillator signal injected therein is of opposite phase, the periods of current flow are reversed so that oscillator signal current flow occurs during the second half period of an oscillator signal cycle.

During the first half period, if the amplified signal between branch points 59 and 60 is of positive polarity phase so as to induce current flow to ground through the path including diode 55, branch point 61, branch point 62 and diode 58, the oscillator signal assists this current flow for the amplified signal. Also, if during this first half period the amplified signal is of negative polarity phase to tend to establish current flow from ground to branch point 59 through the path including branch point 60, diode 57, branch point 61, branch point 62 and diode 56, the oscillator signal permits establishment of this current path since the oscillator signal is again of a polarity to assist current flow. During the second half period, on the other hand, the oscillator signal is of a polarity inconsistent with current flow through the diodes, and the magnitude of the amplified signal, whether positive or negative, is insufficient to overcome the greater magnitude of the anti-current oscillator signal. To assure that no amplified signal passes for low amplitude oscillator signal values occurring at transition times between half cycles, the parallel combination of resistor 64 and capacitor 65 acts as a dynamic bias circuit to develop an additional potential which opposes current flow through the diodes.

It will thus be seen that synchronous rectifier 53 as a whole, insofar as the amplified signal is concerned, acts, respectively, as a very low impedance and as a very high impedance during, respectively, the first and second half periods of the signal cycles. Accordingly, during the first half period the amplified signal is in effect clamped to ground to establish a reference level for this signal, while during the second half period the amplified signal is imparted substantially unchanged to the synchronous rectifier 53'.

It will be recalled that synchronous rectifier 53' is supplied with opposite phase oscillator signal to permit conduction of the amplified signal through the rectifier circuit during, and only during, the recond half period for a signal cycle. With the exception just mentioned, the synchronous rectifier 53' operates in the same manner as that described for synchronous rectifier 53. Accordingly, if for the second half period the amplified signal be of positive polarity phase, a train of positive half cycle pulses appears at branch point 60', while if of negative polarity phase, a train of negative half cycle pulses appears at branch point 60'.

Connected between branch point 60' and ground there is an RC filter including the resistor 90 and the capacitors 91, 92. This filter network converts the train of positive or negative pulses (as the case may be) at branch point 60' into a D. C. signal of, respectively, positive or negative polarity, which D. C. signal is supplied to the input of a multiar circuit 93. As more fully described in section 9.14, vol. 19, "Waveforms," of the M. I. T. Radiation Laboratory Series (published by McGraw-Hill, 1949), the multiar circuit 93 includes a normally conducting pentode 94 having a control grid 95 statically biased well above cut off by a connection to a positive voltage supply through a resistor 96. Additionally, control grid 95 is signal coupled with the input of the multiar through the elements (taken in order from the grid) of the anode 97 of a diode section 98, the cathode 99 of this diode section, and a primary 100 of a regenerative feedback, pulse transformer 101. The cathode 102 of pentode 94 is coupled to ground through the secondary 103 of the pulse transformer while the anode 104 of pentode 94 is coupled to one output terminal 105 of the multiar circuit. The other output terminal 106 of the multiar circuit is connected to ground.

In operation, the multiar circuit will not respond to positive D. C. signals applied to its input. For a negative polarity D. C. signal, however, a current path is established through resistor 96, diode section 98 and primary 100, and the flow of current through this path causes the potential on grid 95 to drop. Responsively, the current decreases through the path including the anode and cathode of pentode 94 and the secondary 103 of pulse transformer 101, the decrease in current in this secondary being fed back regeneratively to the primary 100. By this regenerative effect the grid 95 is driven even further negative to further decrease the current in secondary 103 to cause a further regenerative effect in the multiar to provide as a net result a sharp positive output pulse between output terminals 105 and 106. This positive output pulse is supplied to the sequencing unit 24 (Fig. 1).

To summarize the foregoing description, it will be seen as an over-all effect of the circuits described that when, and only when, the comparison voltage from relay potentiometer 25 exceeds the measured potential from source 26, the multiar circuit 93 provides a positive trigger pulse indicative of the occurrence stated. To phrase it another way, the multiar circuit provides a positive trigger in response to a traversal of a null between the measuring or comparison potential and the potential measured.

*The sequencing unit*

Considering now the circuit organization and operation of the sequencing unit 24 (Fig. 1), as shown with more particularity in the block diagrams of Figs. 4 and 5, the timing of the sequencing unit is controlled by a normally free-running, asymmetric multivibrator 200 (Fig. 4). As shown in detail in Fig. 12, multivibrator 200 comprises a left-hand section including an input terminal 201 and a pentode 202 and also a right-hand section including a triode 203 and an output terminal 204 connected to the junction point 205 between the anode 206 of triode 203 and an anode load resistor 207 for the triode. The pentode 202 and the triode 203 are cross-coupled in conventional multivibrator relation by resistor 208 and capacitor 209 forming one cross-connection and by resistor 210 and capacitor 211 forming another. The values of the mentioned elements in the cross-connections are appropriately selected to provide that when multivibrator 200 runs free, the conducting period for triode 203 is substantially less in each cycle than the conducting period of pentode 202. Thus, over a full multivibrator cycle the output waveform of multivibrator 200 will be asymmetrical in form.

Figure 12:
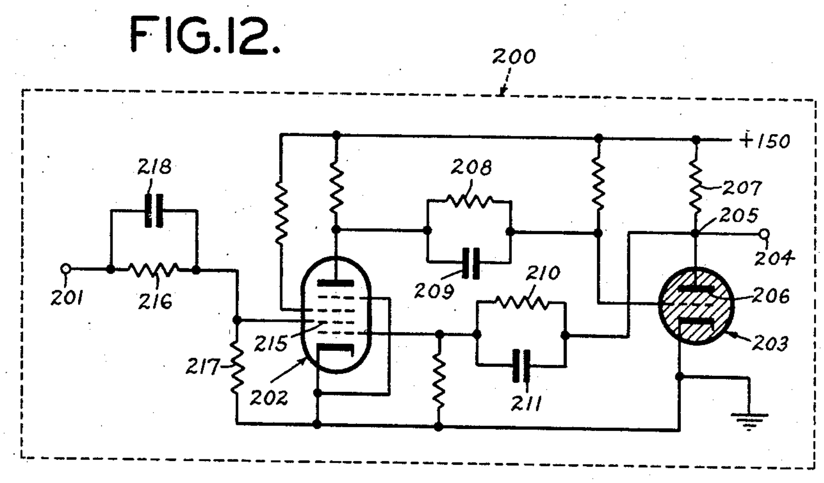

Prior to the start of each operating cycle, a negative potential supplied to input terminal 201 (in a manner later described) is impressed upon the second control grid 215 of pentode 202 via an input circuit including resistors 216, 217, and a compensating condenser 218 connected across resistor 216 to compensate for the inter-electrode capacitance of pentode 202. When second control grid 215 is so driven negative, pentode 202 is cut off to arrest or "clamp" the free-running action of multivibrator 200. Triode 203 during the clamping period is, accordingly, maintained in conducting condition as shown in Fig. 12. Removal of the negative input or "clamping" potential initiates a new measuring cycle by permitting multivibrator 200 to resume its free-running action.

When, at the start of a measuring cycle, triode 203 is cut off, it develops at output terminal 204 a positive potential representing the first part of the output waveform for the multivibrator. This positive output potential continues for the larger interval of a multivibrator cycle until supplanted by a negative potential generated responsive to an intra-cycle reversal of conduction conditions between triode 203 and pentode 202. The negative potential output then continues for the shorter interval until terminated by an end-of-cycle conduction condition reversal restoring triode 203 to the cut-off state which originally initiated the cycle. Thus, the output of multivibrator 200 consists of a train of longer positive square waves alternating with shorter negative square waves, each positive square wave and following negative square wave representing one multivibrator cycle and determining, as later described, the period for one sequencing step in a measuring cycle.

The output of free-running multivibrator 200 (Fig. 17, waveform A) is supplied via leads 220 and 221 (Fig. 4) to the input 222 of an inverter unit 223. As shown in more detail in Fig. 10, inverter unit 223 includes a double triode 224, both sections of which in conjunction with the circuit elements associated therewith are adapted to act as amplifier stages. In the case of inverter unit 223, the output terminal 225 for right-hand triode section 226 is connected via lead 227 (Fig. 4) to the input terminal 228 of the left-hand triode section 229. Thus, inverter unit 223 is connected as a two stage amplifier section to provide at the output terminal 230 for its left-hand triode section 229 an amplified but uninverted form (Fig. 17, waveform A) of the signal supplied to its input terminal 222.

The signal from output terminal 230 of inverter unit 223 is supplied via a lead 235 (Fig. 4) to the input terminal 236 of a power amplifier 237. As shown in detail on Fig. 9, the power amplifier unit 237 includes as a major component a pentode 238 connected as an amplifier and having its control grid 239 connected to the input terminal 236 through an anti-parasitic resistor 240 and a differentiating capacitor 241 in series. The junction of resistor 240 and capacitor 241 is connected through a resistor 242 to ground and through a resistor 243 to a negative voltage supply. Resistors 242, 243 form in series a voltage divider circuit which impresses a static bias upon grid 239 below the cut-off level for pentode 238.

In operation, the square wave signal received at input terminal 236 is differentiated by capacitor 241 to provide positive and negative pulses when the square wave undergoes positive-going and negative-going changes in level. By virtue of its static cut-off bias, pentode 238 can respond only to positive pulses, the pentode in effect clipping the negative input pulses supplied thereto from differentiating capacitor 241. The positive input pulses to which pentode 238 responds are inverted by the amplifying action of the tube to appear as negative pulses at the output terminal 244 for power amplifier unit 237. Thus, the signal at output terminal 244 appears as a train of negative pulses (Fig. 17, waveform B).

The described train of negative pulses is supplied from output terminal 244 to a lead 248 (Fig. 4) which by auxiliary leads is commonly connected with the respective input terminals 249*a*–249*n* of a set of triggers 250*a*–250*n*. This set of triggers includes, among others, a home sequence trigger 250*a* and a sign sequence trigger 250*b*, the remaining triggers from the "800*u*" sequence trigger 250*c* to the "1*u*" sequence trigger 250*n* being trigger circuits which each provide a period during which, by means later described, a comparing voltage of a magnitude equal to the units assigned to the considered trigger is supplied from relay potentiometer 25 (Figs. 1 or 16) to the modulator 20 (Figs. 1 and 2).

Figure 6:
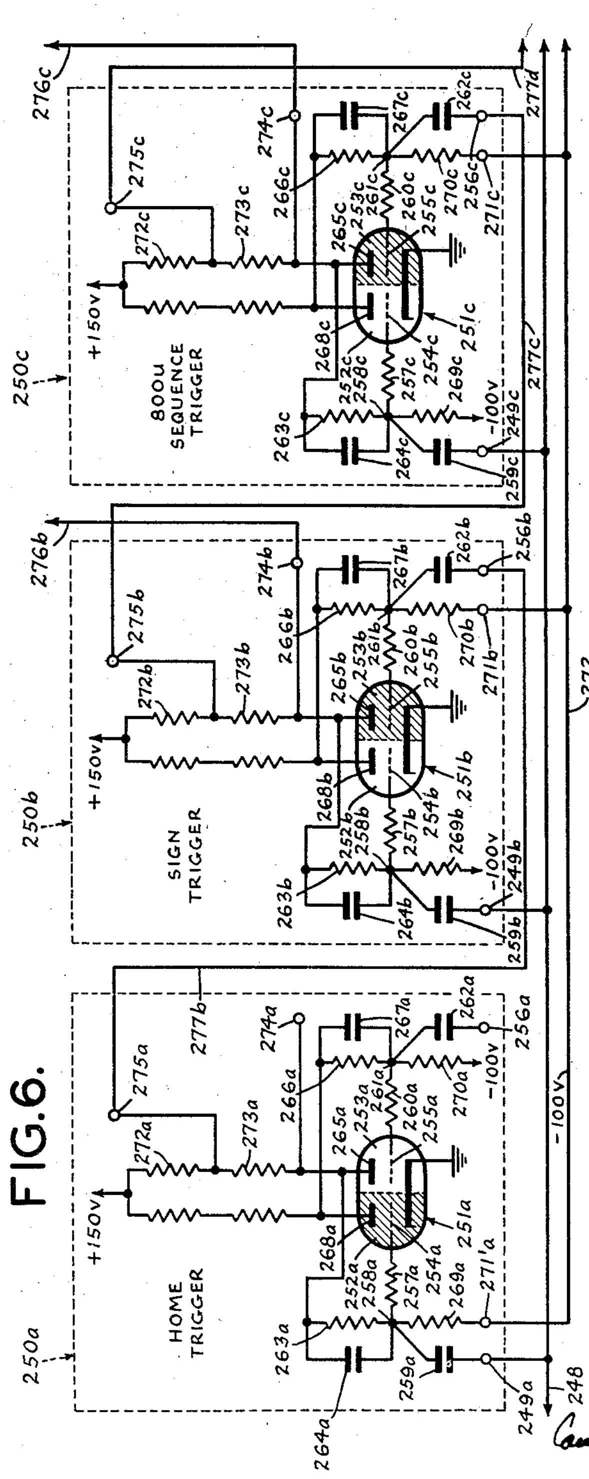

In the set of triggers 250*a*–250*n*, the several trigger circuits are coupled together in an Overbeck ring circuit so that each negative pulse on lead 248 causes a different trigger circuit to be turned "on." For a fuller explanation of the circuit organization and operation of the Overbeck ring circuit, reference is made to Fig. 6.

Considering Fig. 6, the figure shows the home trigger 250*a*, the sign trigger 250*b* and the "800*u*" sequence trigger 250*c*.

Considering the circuit organization of sign trigger circuit 250*b*, (which circuit organization is typical) the sign trigger circuit comprises a conventional, negative pulse sensitive, bistable multivibrator having as a major component a dual triode 251*b* with a left-hand section 252*b* and a right-hand section 253*b*. In the triode the left-hand and right-hand grids 254*b*, 255*b* are respectively coupled to left-hand and right-hand input terminals 249*b* and 256*b* through respective input circuits including, for the left-hand grid, the resistor 257*b*, junction 258*b* and coupling capacitor 259*b* in series and, for the right-hand grid, resistor 260*b*, junction point 261*b*, and coupling capacitor 262*b* in series. Multivibrator cross-coupling is accomplished by the parallel combination of resistor 263*b* and capacitor 264*b* interposed between right-hand anode 265*b* and left-hand junction point 258*b*, and by the parallel combination of resistor 266*b* and capacitor 267*b* coupled between the left-hand anode 268*b* and the right-hand junction point 261*b*. The multivibrator cross connections are completed on the left-hand side by a biasing resistor 269*b* connected between junction point 258*b* and a fixed negative potential supply, and on the right-hand side by a similar biasing resistor 270*b* connected between junction 261*b* and a reset terminal 271*b*. Reset terminal 271*b* is in turn connected to a reset line 272 (commonly serving all the trigger circuits in the Overbeck ring) which, with the exception hereafter mentioned, is continuously maintained at a negative voltage.

Output signals for the sign trigger 250*b* are supplied from a right-hand anode load including resistors 272*b* and 273*b* connected in series between a positive voltage source and the anode 265*b* of right-hand triode section 253*b*. The full voltage across this anode load is supplied to a full output terminal 274*b*, while a part of the anode load voltage is supplied to another output terminal 275*b*. Output terminal 274*b* is connected to a coupling lead 276*b* for purposes to be later described, while output terminal 275*b* is connected via lead 277*c* to the right-hand input terminal 256*c* of the "800*u*" sequence trigger 250*c*.

In circuit organization, the home trigger 250*a* is the exact counterpart of sign sequence trigger 250*b* except that in the home trigger the left-hand biasing resistor 269*a* (rather than the right-hand biasing resistor) is connected to the reset terminal 271'*a*, while right-hand biasing resistor 270*a* (rather than the left-hand biasing resistor) is connected to the fixed negative voltage supply. Additionally, it should be noted that in home trigger 250*a* the right-hand input terminal 256*a* and the output terminal 274*a* are not used. The output terminal of home trigger 275*a* is connected via lead 277*b* to the right-hand input terminal 256*b* of sign sequence trigger 250*b* in the same manner as the output terminal 275*b* of this latter trigger is connected to the right-hand input terminal 256*c* of the succeeding "800*u*" sequence trigger 250*c*.

The remaining sequence triggers 250*d*–250*n*, inclusive, in the Overbeck ring (Fig. 4) are the exact counterparts of sign sequence trigger 250*b*. Each remaining sequence trigger has the same exterior connections as the sign sequence trigger to the preceding and succeeding triggers in the chain, to the driving pulse supply line 248 and to the reset line 272.

Prior to the start of any measuring cycle, the triggers in the Overbeck ring are reset by temporarily removing (in a manner later described) the negative potential normally existing on reset line 272. In sign sequence trigger 250*b*, for example, with this voltage removed, the right-hand triode section grid 255*b* rises in potential (by virtue of its coupling through resistor 266*b* to the relatively high potential at left-hand anode 268*b*) to render right-hand triode section 253*b* conducting as shown in Fig. 6. Each of the other sequence triggers 250*c*–250*n*, inclusive, react in a similar manner during resetting to assume an "off" state in which the right-hand and left-hand triode sections are respectively conducting and cut off. Note, however, in the case of the home trigger 250*a* that the reset terminal 271'*a* is on the left-hand side to accordingly render left-hand triode section 252*a* conducting. Hence, during resetting, home trigger 250*a* is caused to assume an "on" state.

Thus, whatever the previous dispositions assumed by the triggers in the Overbeck ring, after "reset," but just before a measuring cycle, the home trigger is "on" and all the other triggers are "off."

The measuring cycle is initiated by the first negative pulse in the train thereof (Fig. 17, waveform B) on pulse supply line 248. This first negative pulse is impressed via the left-hand input terminal (e. g., terminal 249*b* of sign sequence trigger 250*b*) to the left-hand triode section of each of the trigger circuits in the Overbeck ring. The pulse has no effect on the "off" triggers since the left-hand triode sections of these triggers are non-conducting. Home trigger 250*a*, inasmuch as it is "on," responds, however, to this first pulse to be switched to "off." When switched "off," home trigger 250*a* develops at its output terminal 275*a* a negative going drop in potential (Fig. 17, waveform C) which is supplied via lead 277*b* to the right-hand input terminal 256*b* of sign sequence trigger 250*b*. The right-hand grid 255*b* of sign sequence trigger 250*b* is responsively driven downwards to cut off right-hand triode section 253b to thus switch the sign sequence trigger from "off" to "on." Thus, the sign sequence trigger is switched "on" not by the direct action of the driving pulse on lead 248, but by the indirect action of the change in state of the home trigger. When so switched to "on," the sign sequence trigger 250*b* supplies for the duration of its "on" state a positive output signal at both of its output terminals 274*b* and 275*b* (Fig. 17, waveform D).

When the second negative driving pulse appears on common pulse supply line 248 (Fig. 17, waveform B), all of the triggers in the Overbeck ring are "off" except for sign sequence trigger 250b which is "on." The second negative pulse, accordingly, affects only the sign sequence trigger causing it to switch from "on" to "off." This trigger, upon assuming its "off" state, develops at its output terminal 275b a negative-going voltage drop (Fig. 17, waveform D) which is coupled via lead 277c and input terminal 256c to the "800*u*" sequence trigger 250c, causing the sequence trigger, in the manner previously described, to switch from "off" to "on." The "800*u*" sequence trigger 250c for the duration of its "on" state, accordingly develops a positive voltage at both of its output terminals 274c and 275c (Fig. 17, waveform E). In a similar manner, the third negative pulse (Fig. 17, waveform B) on lead 248 switches the "800*u*" sequence trigger 250c from "on" back to "off," by which change of state the "400*u*" sequence trigger 250d (Fig. 4) is switched from "off" to "on" to thereby develop during its "on" state a positive voltage at both its outputs (Fig. 17, waveform F).

From the above description and from comparison of waveforms D, E and F (Fig. 17), it will be evident that starting with the home trigger 250a, each negative driving pulse received by the Overbeck ring causes the "on" trigger state to be shifted from one trigger to the next trigger in the chain of triggers, and that each trigger when once turned "on" stays "on" until the next pulse is received by the Overbeck ring. It will be further seen that this progressive shift of the "on" state continues until the last or "1*u*" sequence trigger is reached, the action of the Overbeck ring then being exhausted until the various triggers therein are reset anew. One full measuring cycle, therefore, corresponds to one complete "run through" of the Overbeck ring with the measuring cycle being subdivided into a sequence of separate periods representing the "on" or active state of each sequence trigger.

Considering now the relation of the Overbeck ring circuit to the other components of the sequencing unit, it will be evident, as the several triggers switch in succession from "on" to "off," that negative-going voltage drops will be impressed in succession upon the trigger output leads 277b–277n, inclusive. For example, as home trigger 250a switches at the start of a measuring cycle, from "on" to "off," a negative-going voltage change appears on lead 277b (Fig. 17, waveform C). At the end of the "sign" determining step, a similar negative-going voltage change appears on lead 277c in the form of the lagging edge for the positive square wave of waveform D (Fig. 17). The other sequence triggers at the end of their "on" states cause negative-going voltage changes on their associated output leads in a similar manner.

From output leads 277b–277n the mentioned negative-going voltage changes are supplied via tap-off leads 285b–285n to an array of storage triggers 287b–287n, inclusive. As shown in detail in Fig. 8, the sign storage trigger 287b comprises a negative pulse sensitive, bistable multivibrator circuit having as a major component the dual triode 288b divided into a left-hand section 289b and a right-hand section 290b. The left-hand and right-hand triode sections are coupled, respectively, with left-hand input terminal 291b and the heretofore referred to right-hand input terminal 286b. Additionally, the right-hand triode section 290b is coupled with an output terminal 292b and with a reset terminal 293b connected with the reset line 272. Thus, upon "reset," trigger 287b assumes the "off" state shown in Fig. 8. The remaining storage triggers 287c–287n are exact counterparts in circuit organization and exterior connection with the sign storage trigger 287b.

At the start of a measuring cycle, sign storage trigger 287b (and the other storage triggers as well) having been reset, is in its "off" state. Immediately after the start, however, home trigger 250a switches from "on" to "off" to cause a negative-going voltage change (Fig. 17, waveform C) to be delivered, as described, to the right-hand input terminal 286b of the sign storage trigger. Responsive to this negative-going voltage change, the right-hand triode section 290b of the sign storage trigger is driven non-conducting with the result that sign storage trigger 287b switches from "off" to "on" to provide a positive output voltage (Fig. 17, waveform G) at its output terminal 292b. Similarly, when at the end of the "sign" determining step the sign sequence trigger is driven from "on" to "off" (Fig. 17 waveform B), the "800*u*" storage trigger 287c is driven from "off" to "on" to provide a positive output voltage at its output terminal 292c (Fig. 17, waveform H). Similarly, when the "800*u*" sequence trigger 250c at the end of the 800 unit measuring step goes from "on" to "off" (Fig. 17, waveform E), the "400*u*" storage trigger 287d goes from "off" to "on" to provide at its output terminal 292d a positive output signal (Fig. 17, waveform I).

From the described action of the Overbeck ring and from comparison of waveforms D, E and F, respectively, with waveforms G, H, I (Fig. 17), it will be evident that as each sequence trigger in the Overbeck ring is driven "on," the corresponding storage trigger is also initially driven "on." For example, when sign sequence trigger 250b goes "on" (Fig. 17, waveform D), the sign storage trigger 287b also goes "on" (Fig. 17, waveform G). Thus, each storage trigger in the array thereof is successively turned "on" in an order running from the sign trigger 287b through the "800*u*" storage trigger 287c (of highest assigned numerical value) down to the "1*u*" storage trigger 287n (of lowest assigned numerical value).

The positive output signals developed in succession by storage triggers 287b–287n are supplied from their respective output terminals 292b–292n via respective leads 300b–300n to the respective input terminals 301b–301n of an array of driver units 302b–302n (Fig. 5). As shown in detail in Fig. 13, the sign driver unit 302b has as a major component a dual triode 303b, both sections of which have a common input circuit and a common output circuit so that the two sections are adapted to act in tandem. Normally, the dual triode 303b is cut off by a static negative grid bias supplied from a negative voltage source through a resistor 304b to the input circuit for the triode. In response to a positive signal supplied to its input terminal 301b, however, the dual triode 303b is rendered conductive to complete a path for current flow from the output terminal 305b to ground. Thus, driver unit 302b acts essentially as a switching component in which a relatively small signal applied to its input terminal 301b permits establishment of a relatively large current flow through its output terminal 305b.

The remaining driver units 302c–302n in the array thereof are exact counterparts of the sign driver unit 302b. The respective output terminals 305b–305n, inclusive, of the array of driver units, are connected to a common positive voltage supply lead 309 through respective relay windings 311b–311n in a set of relays 310b–310n. Thus, as each driver unit in turn is rendered conducting, each corresponding relay winding is energized in turn by a flow of current from positive voltage supply 309 through the considered relay winding to the output terminal of the associated driver unit and from thence, as described, through this driver unit to ground.

The components in relay 310b associated with the sign relay winding 311b will be considered at a later time. In relays 310c–310n the relay windings 311c–311n control the disposition of a set of movable contacts 312c–312n, respectively associated with the relay windings. For an unenergized relay winding condition the movable contacts 312c–312n respectively assume closed positions with a first set of right-hand fixed contacts 313c–313n. For an energized condition of the respectively associated relay windings, the movable contacts 312c–312n respectively assume a closed position with a second set of left-hand fixed contacts 314c–314n. Thus, each relay winding controls the disposition of a group of contacts including one movable contact and two fixed contacts. For example, the "800u" relay winding 311c controls the contact group including movable contact 312c and fixed contacts 313c, 314c, in such manner that for unenergized and energized conditions of the relay winding, the movable contact respectively closes with fixed contact 313c and with fixed contact 314c.

From the foregoing description it will be evident that in a course of a measuring cycle, as each sequence trigger in the Overbeck ring (Fig. 4) is switched "on" the corresponding relay (Fig. 5) is responsively energized. Postponing for the time being the effect of energization of sign relay 310b, the movable contacts 314c–314n, accordingly, are initially switched in order from the shown right-hand position (Fig. 5) to their left-hand position.

The mentioned movable contacts are related to the operation of the relay potentiometer 25 (Figs. 1 and 5) in such manner that the change in any movable contact from right-hand to left-hand position causes the relay potentiometer to add to its output voltage an increment which in the units of measure employed numerically equals the value assigned to the relay having the shifted movable contacts. Thus, for an initial comparison voltage of zero value and assuming the "microvolt" as the unit of measure employed, when the "800u" relay winding 311c is energized, the shift of its movable contact 312c from right to left causes relay potentiometer 25 to increase its developed comparison voltage to 800 microvolts. If movable contact 312c continues so shifted, the subsequent energization of the "400u" relay winding 311d causes relay potentiometer 25 to add 400 microvolts to the already developed 800 microvolt value, so that the total comparison voltage becomes 1200 microvolts. On the other hand, before "400u" relay winding 311d is energized the "800u" winding 311c may be deenergized to cause the comparison voltage to revert from 800 microvolts back to its initial zero value. As a consequence, the 400 microvolt value added by the energization of the "400u" winding brings the total comparison voltage only up to 400 microvolts.

Whether or not any given relay is deenergized before energization of the next succeeding relay or, alternatively, continues to remain energized for the rest of the measuring cycle, is determined in the manner now to be described.

Referring back to Fig. 4, the Overbeck ring sequence triggers 250b–250n have their respective output terminals 274b–274n connected by leads 276b–276n to the respective input terminals 320b–320n of a set of coincidence units 321b–321n. As shown in detail in Fig. 7, the sign coincidence unit 321b is provided with a pentode 322b having a first control grid 323b and a second control grid 324b. Of these two control electrodes the grid 323b is coupled through a conventional input circuit to an input terminal 325b, while the grid 324b is coupled through another conventional input circuit to the aforementioned input terminal 320b. Both input circuits are coupled to a negative voltage supply with the result that each of grids 323b, 324b is statically maintained considerably below cut off. The pentode 322b is thus connected as a coincidence tube in the sense that there is required a coincidence in time of positive signals on both of the two input terminals 320b and 325b, before pentode 322b will conduct. When pentode 322b does conduct, it provides a negative output signal at an output terminal 326b for the coincidence unit 321b.

The remaining coincidence units 320c–320n, inclusive, are the counterparts of, and have the same exterior connections as, the just described sign coincidence unit 321b.

It will be recalled that in the Overbeck ring (Fig. 4) as each sequence trigger is driven "on" and so remains until supplanted by the next "on" sequence trigger, the chain of sequence triggers supplies in turn a positive voltage upon the output leads 276b–276n, inclusive. Thus, several coincidence units 320b–320n, inclusive, are in turn rendered conditionally capable of conducting. The requirement for outright conduction of a coincidence unit thus sensitized for conduction is that another positive signal must be received by the sensitized coincidence unit, while that unit is supplied with the positive output from its associated sequence trigger. This additional positive signal is provided as follows.

It will be recalled that for each new step generated by the Overbeck ring, a particular relay (Fig. 5) is initially energized to cause the relay potentiometer (Figs. 1 and 6) to develop a particular comparison voltage for that step. This particular comparison voltage is compared by modulator 20 (Fig. 1) in opposed relation to the potential to be measured at modulator input 26. If the comparison potential is less than the potential measured, decision unit 22 provides no output. If, on the other hand, the comparison potential exceeds in absolute magnitude the measured potential, then during this step the decision unit 22 develops a positive output pulse which is supplied to the sequencing unit 24 (Figs. 4 and 5) by a lead 330.

Postponing for the time being the action of the component in the "sign" channel, assume that the potential to be measured lies between 800 and 400 microvolts, so that during the first measuring step of the measuring cycle the measured potential is exceeded by the 800 microvolt comparison voltage developed by relay potentiometer 25. Decision unit 22 (Fig. 1) will, accordingly, supply a positive pulse (Fig. 17, waveform J) via lead 330 (Fig. 4) to the input terminal 325p of a gate unit 321p. As shown in detail in Fig. 11, gate unit 321p is the exact counterpart of the already described sign coincidence unit 321b (Fig. 7) except that in gate unit 321p the output terminal 326p is connected to receive the full output of the pentode 322p, rather than only a portion thereof. Initially, the gate circuit 321p is maintained in a non-conducting condition with the result that at the beginning of the considered measuring step, the positive pulse (Fig. 17, waveform J) fails to pass through the gate circuit.

Figure 10:
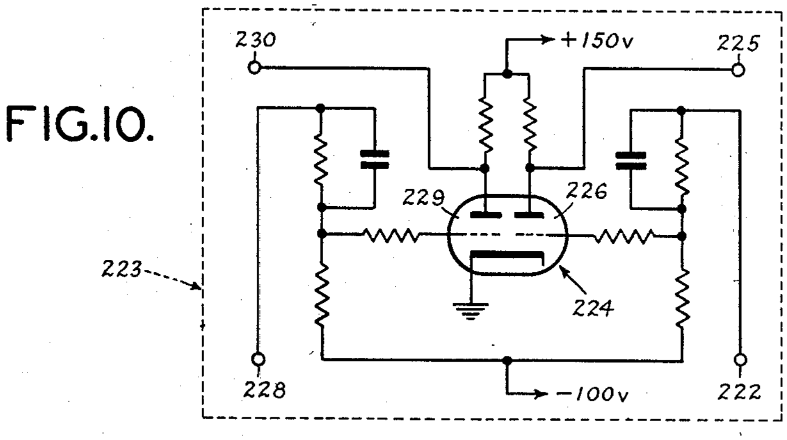
Figure 11:
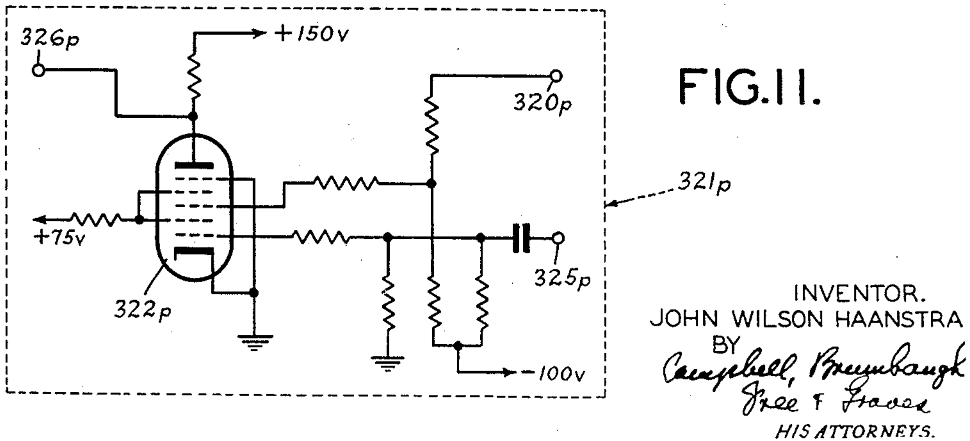

To open the gate circuit, the output signal (Fig. 17, waveform A) of the free-running multivibrator is supplied via lead 340 to the right-hand input 222′ of an inverter unit 223′ which may be the exact counterpart of the inverter unit 223 (Fig. 10). The multivibrator output is amplified and inverted by the right-hand section of inverter unit 223′ to appear at its right-hand output terminal 225′ as waveform K (Fig. 17). Output terminal 225′ is connected via a lead 341 with the input terminal 320p of gate unit 321p (Figs. 4 and 11). Accordingly, the amplified and inverted multivibrator signal (Fig. 17, waveform K) is supplied to gate unit 321p so that the positive peaks of the signal cause the gate circuit to open during the latter part of each measuring step.

When gate unit 321p opens, if a positive pulse is present at its input terminal 325p, a negative pulse will be developed by the action of the gate unit at its output terminal 326p. Thus, in the considered 800 unit measuring step, the positive pulse input to the gate unit from the decision unit (Fig. 17, waveform J) is converted into a negative output pulse (Fig. 17, waveform L) as soon as the positive gating peak (Fig. 17, waveform K) appears during the latter part of the measuring step.

The negative output signal so developed goes to input terminal 228′ of inverter unit 223′, is amplified and inverted in the left-hand section of the inverter unit 223′ (Fig. 10) to provide a positive pulse (Fig. 17, waveform M). This positive pulse is then supplied via left-hand output terminal 230' of the inverter unit to a lead 350 which is commonly coupled to the input terminals 325b–325n of the coincidence units 321b–321n. It will be recalled that during the 800 unit measuring step the "800u" coincidence unit 321c and only this unit has been tentatively rendered capable of conduction by the sensitizing signal shown by waveform E (Fig. 17). Hence, the positive pulse (Fig. 17, waveform M) on the common input line 350 exclusively affects the "800u" coincidence unit 321c, the mentioned positive pulse inducing outright conduction of this unit to provide a negative pulse (Fig. 17, waveform N) at its output terminal 326c.

The output terminals 326b–326n for coincidence units 321b–321n are respectively connected to the input terminals 291b–291n of the storage triggers 287b–287n. Thus, in the case of the "800u" coincidence unit 321c the negative output pulse developed thereby (Fig. 17, waveform N) is supplied to the left-hand input terminal 291c of the "800u" storage trigger 287c. It will be recalled that initially in the 800 unit measuring step, this storage trigger circuit was switched "on" to cause the relay potentiometer 25 to develop an 800 microvolt comparison voltage. Responsive to the negative input pulse received at its input terminal 291c, however, the "800u" storage trigger 287c is re-switched from "on" back to "off" (Fig. 17, waveform H) to thereby cause removal of the 800 microvolt increment of the comparison voltage before the next or 400 unit measuring step is initiated. A similar action occurs for any other storage trigger under like conditions. Thus, if in any measuring step, the total comparison potential exceeds the potential to be measured by the system the last increment added to the comparison potential (and causing the excess) is removed from the comparison potential before the next measuring step is initiated.

If, on the other hand, in any given measuring step the comparison potential does not exceed the potential measured, no positive output pulse (e. g., Fig. 17, waveform J) from decision unit 22 (Fig. 1) is supplied to the input terminal 325p (Fig. 4) of gate unit 321p. Absent this positive pulse, the coincidence unit latently capable of conduction remains non-conducting with the consequence that the storage trigger associated therewith is not re-switched from "on" back to "off," but instead continues to remain in its "on" state. For example, in the assumed case where the potential measured lies between 800 and 400 microvolts, during the 400 unit measuring step the comparison voltage has a total value of 400 microvolts so that the comparison voltage does not exceed the measured voltage. The result follows that the 400 unit storage trigger 287d remains "on" as shown by waveform I (Fig. 17). From the nature of the circuits described, it is evident that so long as any storage trigger remains "on," the relay in the channel of the storage trigger causes the relay potentiometer 25 to retain in its output that increment represented by the "on" storage trigger channel.

In the over-all operation of the system it will be seen that, first, the relay potentiometer develops a comparison voltage which by adding increments and then removing them when necessary approaches by an ever closer approximation to the potential measured, and, second, that the set of movable contacts 312c–312n, inclusive (Fig. 5), progressively assume either right-hand or left-hand positions, which positions are retained as the measuring cycle progresses. Thus, at the end of a measuring cycle, the mentioned movable contacts will have fallen into a binary-type pattern of contact positions, which pattern represents in binary code group form, the quantitative value of the potential measured by the system.

The presently described exemplary system is adapted for measuring potentials whose quantitative value in terms of the measuring unit employed (e. g., microvolts) does not exceed, in decimal terms, a three digit decimal number. According to the scheme employed for representing decimal digits as binary digits, each decimal digit in this three digit number is represented by a separate group of four binary digits. Thus, for example, the highest ranking or "hundreds" decimal digit is represented by binary digits corresponding to the two possible positions of the "800u," "400u," "200u" and "100u" movable contacts. Different position combinations of these four movable contacts represent the ten possible digit values, 0 to 9, of the "hundreds" decimal digit, the mode of representation being that in a position combination the sum of the unit values assigned to the actuated or leftwardly shifted movable contacts equals the represented digit value multiplied by the factor "100" appropriate to the rank of the "hundreds" digit. Thus, the position combination in which the "800u" and "100u" contacts are the only ones leftwardly shifted represents a "hundreds" digit of digit value "9."

It will be appreciated that the position combinations of the various movable contacts may be used to give a direct visual manifestation of the value of the measured potential. Preferably, the movable contacts are used in a well known manner to actuate indicating means (not shown) such as glow lamps which in turn manifest the value of the measured potential. Additionally, the relays, by their movable contact positions, may be employed in a well known manner to provide as an input to another appropriate system (not shown) a body of binary-coded data representing the potential measured.

*Reset circuits and operation*

It will be recalled that as described generally above, prior to the initiation of a measuring cycle there occurs a resetting of the sequence triggers 250a–250n, inclusive, in the Overbeck ring and a simultaneous resetting of the storage triggers 287b–287n, inclusive, in the storage trigger array, the free-running multivibrator 200 being clamped meanwhile to prevent its free-running operation. The circuits which accomplish this resetting and clamping action will now be described.

Referring now to Fig. 5, there is shown a single-pole, single-throw switch 360 having a movable contact 361 connected to a negative voltage supply, and a fixed contact 362 connected through leads 363 and 364, respectively, to the respective input terminals 365a and 365b of a short one-shot trigger 366a and a long one-shot trigger 366b. Normally, switch 360 is maintained in open disposition. For initiating the resetting action, however, movable contact 361 is temporarily closed with fixed contact 362 to thereby cause a negative control pulse to be supplied to the input terminals of both the short and the long one-shot triggers.

As shown in detail in Fig. 14, the short one-shot trigger 366a comprises a conventional monostable multivibrator circuit having as a major component a dual triode 367a with left-hand and right-hand triode sections 368a, 369a. The right-hand triode section 369a, has its anode 370a cross coupled with the grid 371a of the left-hand triode section by a cross-coupling circuit including the resistor 372a and capacitor 373a in parallel. The output terminal 374a for the short one-shot trigger is connected with anode 370a of the right-hand section to accordingly exhibit the voltage appearing at this electrode. The long one-shot trigger 366b operates in the same manner as, and is the exact counterpart of, the short one-shot trigger 366a except that in the long one-shot trigger the values of the cross-coupling resistor and capacitor are selected to provide for a longer duration output period than characterizes the short one-shot trigger.

Normally, both of the one-shot triggers are in the condition shown by Fig. 14 wherein the right-hand triode section is conducting and wherein the outputs from the two trigger circuits may be considered to have zero value. Responsive to the negative control pulse received at their respective input terminals 365a and 365b, however, both trigger circuits transiently change state to provide a positive output potential of relatively short duration (Fig. 17, waveform O) for the trigger 366a and a positive potential of longer duration (Fig. 17, waveform P) for the trigger 366b.

The transient output signal of the long one-shot trigger 366b is initially of no effect. The positive output of the short one-shot trigger 366a, however, is supplied to the input terminal 301p of a relay driver unit 302p which, in circuit organization, may be the counterpart of driver unit 302b shown in Fig. 13, and which, accordingly, comprises a normally cut-off switch and amplifier stage. Responsive to the positive signal received at its input terminal 301p, a current path is closed through relay driver 302p permitting its output terminal 305p to draw current. The output terminal 305p is connected to a positive voltage supply through a relay winding 380, so that when output terminal 305p draws current, the relay winding 380 is energized. Accordingly, it will be seen that winding 380 is energized for the period of the positive output signal (Fig. 17, waveform O) of the short one-shot trigger 366a.

The relay winding 380 controls the disposition of a movable contact 381 in relation to a fixed contact 382. Of these two contacts, the movable contact 381 is connected to a negative voltage supply, while the fixed contact 382 is connected to the line 272 which, as earlier described, provides the reset signal for all the sequence triggers in the Overbeck ring (Fig. 4) and for all the storage triggers respectively associated with the several sequence triggers. Normally, movable contact 381 remains closed with fixed contact 382 to couple the reset line 272 through the two contacts to the negative voltage supply. Upon energization of winding 380, however, the contacts open to cause line 272 to be temporarily disconnected from its normal negative voltage source. When line 272 is so disconnected, all of the sequence and storage triggers, in the manner heretofore described, become reset to the condition which is proper for the undertaking of a new measuring cycle.

In addition to resetting the sequence and storage triggers (Fig. 4), the reset line 272 by a connection (Fig. 5) to the reset input terminal 293p of a bistable clamping trigger 287p is adapted to switch this trigger to an "off" state from an "on" state assumed by the trigger during a prior measuring cycle. Bistable clamping trigger 287p may be a counterpart of the negative pulse sensitive bistable multivibrator circuit 287b shown in Fig. 8, the multivibrator in its "off" state having its right-hand section conducting as shown in this figure. With regard to external connection, the bistable clamping trigger has its input terminal 286p connected to the output terminal 374b of the previously described long one-shot trigger 366b, and has its output terminal 292p connected via a lead 390 to the input terminal 201 of the free-running asymmetric multivibrator 200 (Figs. 4 and 12).

Figure 8:
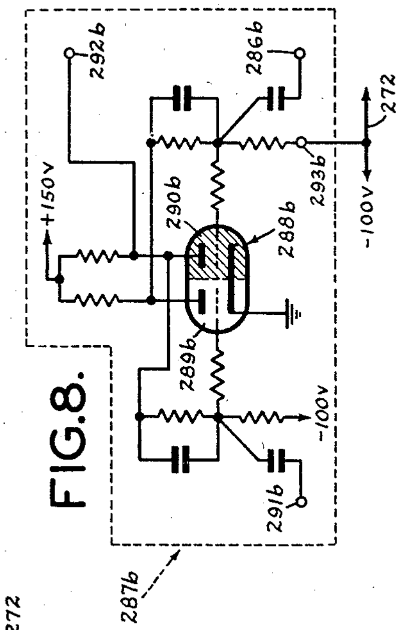
Figure 7:
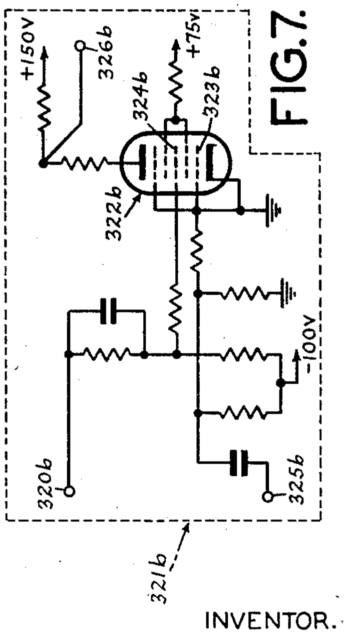
Figure 9:
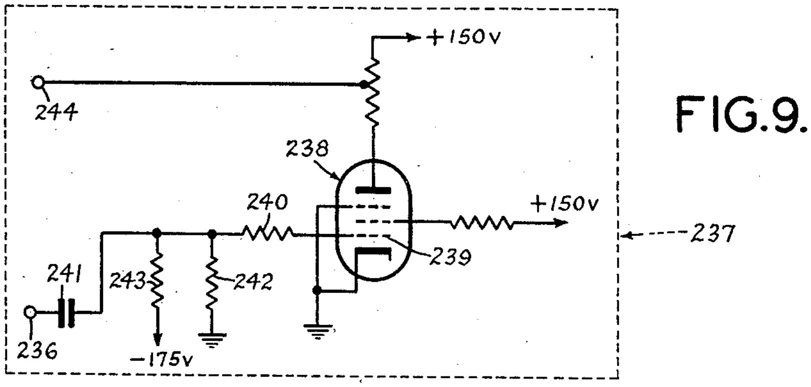

In view of the internal circuit organization and the exterior connections of bistable clamping trigger 287p, it will be seen that as soon as line 272 is disconnected as described, the clamping trigger assumes the "off" state shown in Fig. 8 to provide a negative potential at its output terminal 292p (Fig. 17, waveform Q). When this negative potential is supplied via lead 390 to input terminal 201 of free-running multivibrator 200, the multivibrator is "clamped," as previously described, to prevent its free-running so long as the mentioned negative potential signal continues.

Termination of the negative clamping wave is effected when the long one-shot trigger 366b reverts from its transient state to its normal state to thereby terminate its positive output signal (Fig. 17, waveform P). The lagging edge of this signal takes the form of a negative-going voltage change which, when supplied via input terminal 286p to the bistable clamping trigger 292p, causes this trigger to switch from its currently assumed "off" state to an "on" state. Responsive to this change in state, the negative clamping voltage terminates (Fig. 17, waveform Q) and the free-running multivibrator 200 is thereupon released to renew its free running action (Fig. 17, waveform A). The free-running multivibrator, accordingly, once again drives the Overbeck ring in the manner previously described to cause a new measuring cycle to take place.

It will be noted from comparison of waveforms O and Q (Fig. 17) that a time interval elapses between the termination of the reset signal (waveform O) and the termination of the negative clamping voltage (waveform Q). This delay in ending the clamping voltage is advantageous since it assures that all of the resettable circuits have, in fact, been reset and then restored to normal operating conditions (by reclosure of movable contact 381 with fixed contact 382 in Fig. 5) before the free-running multivibrator is released to initiate a new measuring cycle.

*The sign relay channel*

From the description above, it will be recalled that as an important characteristic in the operation of the presently described measuring system, the modulator 20 (Fig. 1) develops a difference signal between the potential to be measured from source 26 and the comparison potential from relay potentiometer 25, this difference signal having, say, a positive sense when in absolute terms the comparison voltage is less than the potential measured, and, say, a negative sense when in absolute terms the comparison voltage exceeds the potential measured. In the discussion to the present time it has been assumed that both the potential measured and the comparison potential are positive in magnitude. Assuming positive magnitude as the normal condition, upon occasion it becomes desirable to measure a potential from source 26 (Fig. 1) having a negative magnitude. It will be realized in such case, however, that a comparison voltage of normal positive magnitude cannot be employed since whatever the magnitude value of the negative potential to be measured, a positive comparison potential would always algebraically exceed the potential measured, and, hence, the system would not be operative. In order to make provision for the detection and measurement of negative voltages, therefore, there is employed a "sign" channel, the components and circuits of which will now be described.

The sign channel comprises (Fig. 4) the sign sequence trigger 250b, a coincidence unit 321b, a sign storage trigger 287b, together with (Fig. 5) a relay driver unit 302b and a sign relay 310b having a number of component elements. Except for the sign relay 310b, the nature, external connection and operation of all of the mentioned units in the sign channel have hitherto been generally described, and, hence, only a brief recapitulation of the operation of the familiar units is necessary.

As described, when a measuring cycle begins the sign sequence trigger 250b (Fig. 4) is the first sequence trigger in the Overbeck ring to be switched from "off" to "on," the determination of "sign" being thus the first step in a measuring cycle. When the sign sequence trigger is so actuated, as a first effect the sign coincidence unit 321b becomes conditioned to operate if and when an input pulse appears on its input terminal 325b. Also, when the sign sequence trigger is so actuated, the sign storage trigger 287b is turned "on" to energize the relay winding 311b (Fig. 5) through the relay driver unit 302b.

Relay winding 311b controls the dispositions of four sets of relay contacts, each set including a movable contact, a left-hand fixed contact, and a right-hand fixed contact, to provide altogether four movable contacts 400a–400d, four left-hand fixed contacts 401a–401d and four right-hand fixed contacts 402a–402d. All four movable contacts are ganged together so that when winding 311b is unenergized, each movable contact closes with its right-hand fixed contact, but when the winding is energized, each movable contact is shifted to close with its left-hand fixed contact.

Of the fixed contacts, the contacts 402*a* and 401*b* are connected to one input terminal 403 of relay potentiometer 25, the contacts 401*a* and 402*b* are connected to the other input terminal 404 of this potentiometer, the contacts 402*c* and 401*d* are connected to one output lead 405 running to the synchronous rectifier (Fig. 3), and the contacts 401*c* and 402*d* are connected to another lead 406 running to the synchronous rectifier. Of the movable contacts, the contacts 400*a* and 400*b* are respectively connected to a pair of terminals 407 and 408 which are adapted to have impressed thereacross a voltage E representing the source or input voltage for the relay potentiometer. The other movable contacts 400*c* and 400*d* are respectively connected to a pair of leads 409, 410 which carry the alternating signal output developed by the oscillator 23 for operating the synchronous rectifier circuits (Fig. 3) in the decision unit 22. The variable resistance device 30 (Fig. 2) in modulator 20 is supplied with the signal from oscillator 23 by a pair of leads 411, 412 which by pass the last-named movable contacts. For normal operation (which assumes a positive potential to be measured received by modulator 20) the voltage E is applied with a polarity to terminals 407, 408, so that for the contact disposition shown in Fig. 5 the relay potentiometer provides a positive comparison voltage as an output upon leads 413, 414. Similarly, for normal operation, the phase of the signal from oscillator 23 is such that, with the relay contacts shown as disposed in Fig. 5, the signal, when reaching, via leads 405, 406, the synchronous rectifier circuits of Fig. 3, causes this circuit to develop a negative output signal, or decision unit 22 to develop a positive trigger pulse only when the positive comparison potential exceeds the positive voltage measured.

When, as the first step in the measuring cycle, the relay winding 311*b* is energized in the manner described to shift movable contacts 400*a*–400*d* from right to left, this contact shift, although reversing the polarity of potentiometer source voltage E with regard to the potentiometer input terminals 403, 404, does not act significantly upon the potentiometer since the comparison voltage output from the potentiometer has zero value at this time. The contact shift does have a significant effect upon the synchronous rectifier circuits (Fig. 3), however, in that by the closure of movable contacts 400*c*, 400*d* with, respectively, left-hand fixed contacts 401*c*, 401*d*, the phase of the alternating signal from oscillator 23 to the synchronous rectifiers is reversed.

Since the synchronous rectifier circuits are phase-comparing circuits, the observable effect of reversing the oscillator signal input to the synchronous rectifiers is exactly the same as if the oscillator signal had remained unreversed in phase, but concurrently a phase reversal had occurred in the amplified signal input to the rectifier. Thus, for convenience of analysis it can be assumed that the effect of the contact shift is to introduce an extra phase reversal into the difference-modulated alternating signal after it leaves modulator 20 (Fig. 1), but before it reaches the synchronous rectifiers in decision unit 22 (Fig. 3).

In the normal case where the potential measured has a positive magnitude, if the synchronous rectifiers see a phase reversal in the amplified signal input, the synchronous rectifiers trigger, as described, the multiar circuit to cause the same to develop an output pulse. Thus, in the "sign" determining step if there is present a positive potential to be measured, although no comparison voltage is available to effect a real phase reversal by exceeding the potential measured, the extra phase reversal apparently introduced by the "sign" relay has the same effect as if a real phase reversal had occurred. The multiar circuit, accordingly, will be triggered to produce an output pulse, and this positive output pulse upon being received in the manner hitherto described at the input terminal 325 of sign coincidence unit 321*b* (Fig. 4), causes this unit to switch the sign storage trigger 287*b* from "on" back to "off." In response to this change in state of the sign storage trigger, the winding 311*b* of the sign relay becomes deenergized and the movable contacts 400*a*–400*d*, inclusive, accordingly shift back to the right to restore the usual operating conditions for the circuit.

Where, on the other hand, the potential to be measured has a negative magnitude, the initial difference signal developed by modulator 20 (Fig. 1) even during the "sign" determination step will exhibit a real phase reversal for the obvious reason that even though the comparison voltage is of zero value at this time, the zero value of the comparison voltage nonetheless exceeds the negative value of the potential to be measured. Thus, in the negative case, the difference signal seen by the synchronous rectifiers has undergone one real phase reversal and one apparent phase reversal introduced by the action of the "sign" relay. The two phase reversals cancel each other in effect so that, insofar as the synchronous rectifiers are concerned, the situation is the same as in the positive measuring case where the comparison voltage does not exceed the potential measured. Accordingly, where a negative potential to be measured is present during the "sign" determining step, the multiar circuit is not triggered with the consequence that winding 311*b* remains energized throughout the measuring cycle (Fig. 17, waveform G) to retain all of movable contacts 400*a*–400*d* in left-hand position. It follows that because of the consequential reversal of polarity of source voltage E as seen by terminals 403, 404 of relay potentiometer 25, the relay potentiometer provides as an output a negative comparison voltage. It also follows in this negative case that during measuring the multiar circuit will be triggered when, and only when, the negative comparison voltage exceeds algebraically in magnitude sense the magnitude of the negative potential measured.

Thus, it will be seen that the presently described system is adapted to handle automatically and with equal facility either positive magnitude or negative magnitude potentials to be measured by the system.

*The relay potentiometer*

Considering now the already generally described relay potentiometer (Fig. 1), a more detailed representation of this circuit component is furnished by Fig. 16. Referring to this latter figure, the relay potentiometer 25 is comprised of a "unit" decade network 500, a "ten" decade network 501, a "hundred" decade network 502 and a digit-ranking network 503. Each of the mentioned networks may be considered to have a high side and a low side, the high side of the "unit," "ten" and "hundred" decade networks being connected to the high side of the digit-ranking network through the respective terminals 504, 506, 508, and the low side of the mentioned decade networks being connected to the low side of the digit-ranking network through the respective terminals 505, 507, 509. The low sides of all of the networks are maintained at a common potential by a return lead 510 serving as a common return path for all the networks.

For convenience, the relay potentiometer input terminals 403, 404 (Fig. 5) are also shown in Fig. 16. The potentiometer supply voltage E is shown as applied directly across these input terminals; it being understood that the polarity of voltage E may be reversed in the manner previously described. For further convenience, the set of relay contacts in each digit channel as, say, contacts 312*c*, 313*c*, 314*c* in the 800 unit channel (Fig. 5) are also shown in Fig. 16. It will be noted that the input terminal 404 is coupled to the common return lead 510, while the input terminal 403 is coupled to a voltage supply lead 511 which serves all the decade networks.

Considering the "hundred" decade network 502 as typical, this network includes, extending in the order named away from high-side terminal 508, the serially connected resistors 515c, 515d, 515e. Additionally, there is provided in shunt between the high side and the low side a last resistor 515f which is a terminating resistor for the end of the network opposite terminals 508, 509. The "hundred" decade network 502 also includes a set of shunt resistors 516c–516f respectively coupled between the movable contacts 312c–312f, inclusive, and a set of branch points 517c–517f. As shown in Fig. 16, each of the series resistors 515c–515e, inclusive, has a value "R," while the terminating resistor 515f and the shunt resistors 516c–516f, inclusive, have the value "2R." The value "R" as used is merely a ratio value which may, in practice, be translated into any appropriate actual value, as, say, 10,000 ohms.

With regard to the relay contacts in "hundred" decade unit 502, the right-hand fixed contacts 313c–313f are each respectively connected to the common return line 510, while the left-hand fixed contacts 314c–314f are each respectively connected to the voltage supply line 511. For the normal or zero output condition of the "hundred" decade unit, all of the movable contacts 312c–312f are in right-hand position to respectively close with the fixed contacts 313c–313f.

By virtue of the described distribution of resistor ratio values, the "hundred" decade network 502 has certain important impedance characteristics which may be briefly summarized by stating that if the network is broken to the left of any high-side branch point so as to isolate a left-hand network section, the impedance between the point of break and the low side when looking into this section has a value of "2R." On the other hand, when the network is broken just to the right of any high-side branch point so as to isolate a left-hand network section, the impedance between the point of break and the low side when looking into this section has a value of "R."

The above statements can be verified by a practical check. Suppose the high side of the "hundred" decade network 502 is broken just to the left of branch point 517f. The leftward-looking impedance at the point of break is then obviously "2R," the value of resistor 515f. Assume now the network is broken just to the right of branch point 517f. Looking leftward from the point of break, resistors 515f and 516f, each having a value of "2R," are seen in parallel and the leftward-looking impedance is thence "R." Now suppose the network is broken just to the left of branch point 517e. The leftward-looking impedance from this breakpoint is "R" (the value of resistor 515e) plus "R" the value of resistors 515f and 516f in parallel) or "2R" in all. Now assume the network is broken just to the right of branch point 517e. The total resistance of the path from this branch point through resistor 515e has just been shown to be "2R." The resistance of the path from this branch point through shunt resistor 516e is also "2R." These two paths from branch point 517e are in parallel. Therefore, from the point of break, which is to the right of branch point 517e, the leftward-looking impedance will appear to be "R." The same analysis can be applied to each of the branch points in the network.

Note that since terminals 508, 509 are to the right of branch point 517c that, looking leftward from these terminals into the entire "hundred" decade network 502, the impedance of the network will appear to be "R." Hence, the apparent impedance of this network as an element in the digit-ranking network 503 can be represented by a symbolic resistance 520 of value "R" interposed between terminals 508 and 509.

As previously described, when by energization of the 800 unit digit channel, movable contact 312c is shifted leftwards to open with contact 313c and to close with contact 314c, the relay potentiometer 25 is induced to add to its comparison voltage output an increment of 800 units. In a similar manner, leftward shifts, individually, of contacts 312d, 312e and 312f develop comparison voltage increments of 400, 200 and 100 units, respectively. Thus, the "hundred" decade network provides graded voltages in the ratio 8:4:2:1 in accordance with the channel energized.

The manner in which the "hundred" decade network 502 provides graded voltage outputs in the ratio 8:4:2:1 will be made more evident by the application of Thevenin's theorem. The theorem states that a network of the type described behaves, insofar as a load impedance connected across its terminals is concerned, as though the network is equivalent to a simple generator having an internal impedance "Z" and a generated voltage "V," where "V" is the voltage that appears across the terminals when no load impedance is connected and "Z" is the impedance that is measured between the terminals when all sources of voltage in the network are shortcircuited.

Applying the theorem first to the case where only movable contact 312c is shifted to the left, assume removal of any load connected between terminals 508, 509. The voltage E between terminals 403 and 404 will cause current to flow through the "2R" resistor 516c to the branch point 517c, and thence leftward from branch point 517c through the rest of the network. Viewed from branch point 517c, however, the network to the left of this branch point has an impedance value of "2R." Therefore, branch point 517 represents the half-way mark for the total voltage drop of source voltage E so that the voltage seen at terminals 508, 509 is E/2. Therefore, the equivalent voltage V in Thevenin's theorem is E/2.

Next, assume in accordance with Thevenin's theorem that input terminals 403, 404 are shorted together to eliminate the effect of the source voltage E upon the "hundred" decade network. Under these conditions, the impedance at terminals 508, 509 looking into the network will, for the reasons previously stated, be equal to "R." Hence, in the 800 unit case, Thevenin's equivalent impedance "Z" equals "R." It follows, for leftward shift of the 800 unit movable contact 312c that insofar as any load impedance across terminals 508, 509 is concerned (i. e., the impedance reflected into these terminals by digital-ranking network 503), Thevenin's equivalent circuit for the "hundred" decade network 502 will be a simple generator of voltage E/2 serially connected through a simple resistance of value "R" across the terminals 508, 509.

Next, consider the situation where the 400 unit movable contact 312d is alone shifted leftward to close with fixed contact 314d. Suppose the high side of the "hundred" decade network is broken just to the right of branch point 517d. If the network section to the right of the break is considered a load, for the reasons stated above, by a first application of Thevenin's theorem the entire network to the left of this point of break can be replaced by the equivalent circuit of a generator with voltage E/2 serially connected with a resistor of value "R." Consider this replacement to be made, the mentioned break point to be mended, and apply Thevenin's theorem for the second time. With terminals 508, 509 open, looking to the right, the substituted voltage E/2 is applied across the series combination of an equivalent resistor of value "R," the real resistor 515c of value "R" and the real resistor 516c of value "2R." Hence, as seen at terminals 508, 509, for the 400 unit case Thevenin's equivalent voltage is E/4. Shorting terminals 403 and 404 to eliminate source voltage E, the impedance from terminals 508, 509 into the circuit resulting by the described replacement will be "R," since the series branch including real resistor 516c and the equivalent resistor and having a value "2R" will be in parallel with the real resistor 516c having the value "2R." Thus, when the 400 unit movable contact **312*d* is shifted left, insofar as any load impedance across terminals 508, 509 is concerned (i. e., the impedance reflected into these terminals from the digit-ranking network 503), Thevenin's equivalent circuit will be a generator of voltage E/4 serially connected with a resistance of value "R" across the terminals 508, 509**.

From the above analysis, it is seen that with energization of either the 800 unit channel or the 400 unit channel alone, insofar as any load across terminals 508, 509 is concerned, the same equivalent circuit results across these terminals except that for the 800 unit channel, the equivalent voltage is E/2, and for the 400 unit channel the equivalent voltage is E/4. By analogy it will be seen that for energization of the 200 unit and 100 unit channels, the equivalent voltages will be E/8 and E/16, respectively. Thus, for the 800, 400, 200, and 100 unit channels energized alone, the "hundred" decade network 502 provides equivalent voltages in the ratio 8:4:2:1 as desired, these equivalent voltages being applied through an equivalent resistor of value "R" across the terminals 508, 509 and thus across a load connected between these terminals. Moreover, by the superposition principle it will be seen that these equivalent voltages developed by the "hundred" decade unit 502 are cumulative in effect in the sense that the total equivalent voltage developed for application across terminals 508, 509 is the sum of the individually developed equivalent voltages.

The "ten" decade network 501 and the "unit" decade network 500 are exact counterparts in circuit organization and magnitude of equivalent voltages developed to the already described "hundred" decade network 502. Obviously, however, for proper operation of the relay potentiometer 25, the voltages developed by the "ten" decade unit should have ten times the value of the voltages developed by the "unit" decade network, and similarly, the voltages developed by the "hundred" decade network should have ten times the magnitude value of the voltages developed by the "ten" decade network. This weighting in magnitude of the voltages developed by the several decade networks is accomplished by the digit-ranking network 503 now to be described.

Considering the digit-ranking network, a network-terminating, shunt resistance path is provided at one end of the network and between the high and low side thereof by the serially connected resistors 525 and 526, the series impedance of the two resistors together equalling "9R." The output from relay potentiometer 25 is taken between an output terminal 527 connected to common return line 510 and an output terminal 528 connected to a movable tap 529 which contacts resistor 526 at selected positions along the length thereof.

Working away from the mentioned network terminating, shunt resistance path, the high side of digit-ranking network 503 includes in series connection in the order named, a branch point 530, a resistor 531 of "8.1R" value, a branch point 532, a resistor 533 of "8.1R" value, and a branch point 534. As shown in Fig. 16, branch points 530, 532 and 534 are directly connected, respectively, with the high side terminals 508, 506, 504 for the "hundred," "ten" and "unit" decade networks. Hence, as shown in Fig. 16, by symbolic resistors 520, 521 and 522, the equivalent "1R" resistances of these decade networks (looking leftward from the mentioned terminals) appears between each of the mentioned branch points and the low side of digit-ranking network 503. Additionally, a shunt resistor of value "9R" is connected between the branch point 534 and the low side of the digit-ranking network, the resistor being designated 535.

Considering the ratio values of the elements in digit-ranking network 503, the "9R" series value of resistors 525 and 526 is in parallel with the "1R" value of equivalent resistor 520, to yield together a combined shunt value of ".9R" between branch point 530 and the low side. This ".9R" value insofar as a voltage at branch point 532 is concerned, is in series with the "8.1R" resistor 531 to give a total value of "9R" for the mentioned series path. Since ".9R" is one-tenth of the value of "9R," it will be seen that a voltage appearing between branch point 532 and the low side will be attenuated by a factor of 10 as manifested between branch point 530 and the low side. Thus, the voltages developed by the "ten" decade network 501 are attenuated by the digit-ranking network 503 by a factor of 10 as compared to the voltages developed by the "hundred" decade network 502.

As stated, as seen from branch point 532, the impedance seen to the low side through resistance 531 has a total value of "9R." Connected in parallel with this equivalent "9R" resistance is the "1R" equivalent resistance 521 furnished by the "ten" decade network 501. Hence, between the branch point 532 and the low side of the digit-ranking network 503 there exists a total equivalent resistance of ".9R." Insofar as branch point 534 is concerned, this total equivalent resistance is in series with the "8.1R" resistor 533. For the reasons described, it will be seen, accordingly, that a voltage appearing between branch point 534 and the low side will be attenuated by a factor of 10 as it manifests itself at the branch point 532. Thus, it will be seen that digit-ranking network 503 attenuates voltages developed by "unit" decade network 500 by a factor of 10 in traveling from branch point 534 to branch point 532, and by another factor of 10 in traveling from branch point 532 to branch point 530, or by a factor of 100 in all. Thus, the digit-ranking network 503 gives the proper magnitude weight to the voltages from the several decade networks as these voltages appear at branch point 530.

As stated, the resistors 525 and 526 are serially connected between branch point 530 and the low side of the digit-ranking network 503. Hence, by adjusting the tap 529, the output voltage $e_0$ of relay potentiometer 25 can be made any desired fraction of the voltage appearing between branch point 530 and the low side of the network. By using a source voltage E of appropriate value, and by appropriate adjustment of tap 529, the magnitude of output voltage $e_0$ can be so selected that for the energization of any value channel as, say, the 800 unit channel, there is added to the output voltage $e_0$ a corresponding increment having the same value in the units employed (as, say, microvolts) as the value assigned to the channel energized.

In passing it should be noted that the decade networks described are of the iterative impedance type in the sense that the leftward-looking impedance of the networks, taken from a point of break the left of any branch point, always is the same value (2R) regardless of the branch point chosen. This characteristic, coupled with the additional characteristic that the impedance of each shunt resistor in the networks equals the iterative impedance are important factors enabling the network to provide the systematically graded output voltages hitherto described.

It should also be noted that each of the decade networks, when looking rightward from its output terminals (e. g., terminals 504, 505 for "unit" decade network 500) into the digit-ranking network 503, sees the same equivalent load impedance across these output terminals, the value of each equivalent load impedance being "4.5R." The co-equality of these equivalent load impedances, together with the characteristic that all the decade networks are counterparts, is an important factor in enabling the digit-ranking network 503 to appropriately "weight," as described, the output voltages of the several decade networks.

*The relay lockout circuits*

The presently described measuring system is subject for particular values of the measured potentials to possible ambiguities in its measuring operation, which ambiguities, if resolved by the system in an improper manner, would result in a false representation by the relay potentiometer of the measured potential. To illustrate, it is obvious that the measuring system, according to its presently described embodiment, is adapted to manifest (as a four binary digit code group for each decimal digit) no more than a three decimal number. Hence, it is obvious that the highest value measured potential which can be manifested is one which in decimal terms has the value "999."

Assume now that the potential measured has, in fact, a value lying between "999" and "1000." Following the sequence of steps in a measuring cycle for the described embodiment, as a first step the 800 unit channel will be energized to close the 800 unit relay 310c (Fig. 5) to cause the relay potentiometer to develop a comparison voltage of 800 units. Since this comparison voltage does not exceed the measuring potential, the 800 unit relay will remain closed for the rest of the measuring cycle.

As a next step, the 400 unit channel is energized to close the 400 unit relay 310d (Fig. 5) to cause the relay potentiometer to add a 400 unit increment to its output, the total developed comparison voltage thus being 1200 units. Since this comparison value exceeds the measured potential, the 400 unit relay will open to thus return the comparison voltage to 800 units.

On the third step, the 200 unit channel in a similar manner is energized to close the 200 unit relay to cause the relay potentiometer to add 200 units to the presently subsisting 800 unit comparison voltage, the total comparison voltage developed thus being 1000 units. This 1000 unit value marginally exceeds the measured potential value lying between 999 and 1000 units, and hence, if the resolution of the measuring system were perfect, the 200 unit relay would open to remove the 200 unit increment from the comparison voltage to thereby provide a proper manifestation of the measured potential. It may happen, however, that the resolution of the system is not perfect because of a slight deviation of the comparison voltage from its proper value and that, accordingly, in the situation described, the 200 unit relay, instead of opening, remains closed. In such case, the 800 and 200 unit relays together provide a manifestation equivalent to the value "10" and the system as a whole would provide a manifestation equivalent to the value "1000." The particular form taken by these manifestations, however, is one for which the system does not provide since the only values which can be represented are the true digit values ranging from 0 to 9. Hence, no significance can be attached to these manifestations according to the scheme employed for representing decimal values in binary terms.

It will be appreciated that similar situations productive of ambiguity may occur where the measured potential in decimal value terms is in the vicinity of "100" or "10."

Figure 13:
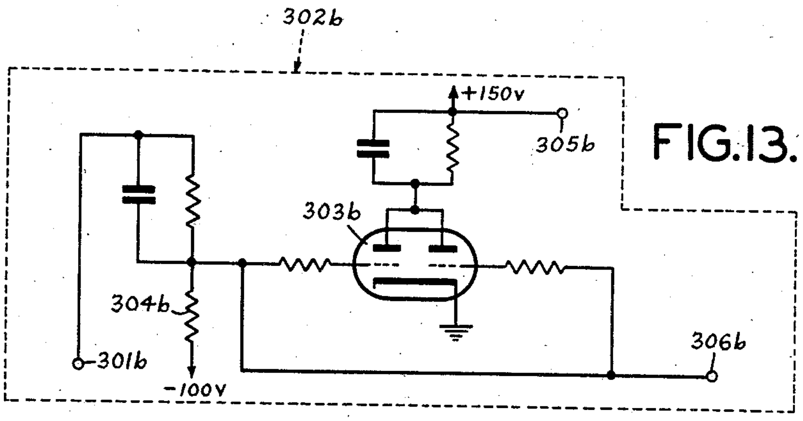

To prevent the occurrence of such anomalous manifestations, there are employed relay lockout circuits now to be described. It will be recalled that the 800 unit driver 302c (Fig. 5) is rendered operative by a positive square wave applied to its input terminal 301c, and that this positive square wave is impressed via the internal input circuit of this driver unit (Fig. 13) to a tandem connected pair of triode control grids within the driver unit and normally biased negative by connection of the grids through a resistor to a source of negative voltage supply. The driver unit 302c has an output terminal 306c which, as indicated by the typical driver unit circuit of Fig. 13, is connected with the input circuit of the driver unit to also bear the static negative potential of the input circuit. Output terminal 306c (Fig. 5) is connected to the left-hand input terminal 550 of a lockout unit 551.

Figure 15:
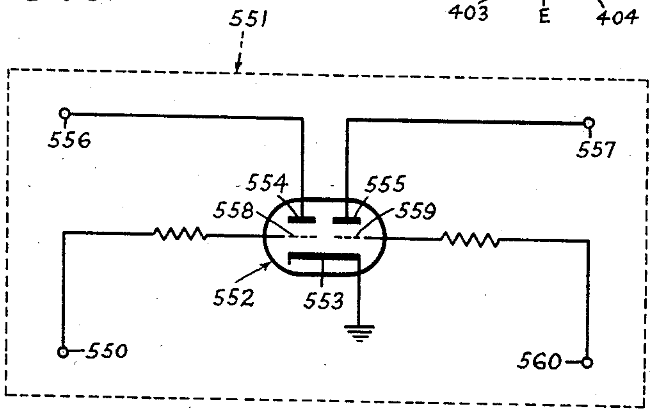

As shown in detail in Fig. 15, the lockout unit has a major component, the dual triode 552 having its common cathode 553 connected to ground, its left-hand and right-hand anodes 554 and 555, respectively, connected to the left-hand and right-hand terminals 556, 557, and its left-hand and right-hand control grids 558, 559, respectively, connected to the left-hand and right-hand terminals 550 and 560. Normally, the negative bias from terminal 306c (Fig. 5) when applied via input terminal 550 to the left-hand section of the lockout unit 551 maintains the control grid 558 at a level below cut off. When, however, the 800 unit driver 302 is rendered operative, as described, by the positive potential at its input terminal 301c, this positive potential is communicated via the driver unit output terminal 306c (Fig. 5) to the lockout unit control grid 558 (Fig. 15) to thus render the left-hand triode section capable of conduction if an anode voltage is thereafter supplied to the left-hand anode 554. Since, in the situation considered, it will be recalled that the 800 unit driver 302c receives this positive potential from the first step in the measuring cycle onward, it will be evident that the left-hand section of the lockout unit 554 will be, accordingly, rendered capable of conduction from this first step onward including, as a time of particular interest, the step during which the 200 unit channel is energized.

For the actual lockout action, the output terminal 292e (Fig. 4) of the 200 unit storage trigger 287e is connected via a lead 300e' to the left-hand terminal 556 of the lockout unit 551. It will be recalled that during the first part of the 200 unit measuring step the output terminal 292e provides a positive potential which is supplied via lead 300e to the input terminal 301e of the 200 unit relay driver 302e to render this driver unit operative. In the case considered, however, where the 800 unit relay remains closed, the output terminal 292e is furnished with a low impedance path to ground by the lockout unit 551. This low impedance path exists because conduction is permitted between left-hand anode 554 and cathode 553 (Fig. 15) by virtue of the positive potential on left-hand grid 558, which renders the left-hand section of triode 552 capable of conduction. The lockout unit 551 thus shorts out the output of the 200 unit storage trigger 287e to prevent the 200 unit driver 302e from being operated, and to thus prevent the 200 unit relay 310e from closing at all.

It will be seen, accordingly, if the 800 unit relay assumes a continuing closed position, that the 200 unit relay cannot be closed at all. Such locking out of the 200 unit channel does not adversely affect the conversion by the system of a measured potential value into a binary digit manifestation, since for any potential value which may properly be measured, the 200 unit increment lost in this situation to the comparison voltage by locking out of the 200 unit channel, is suitably replaced by increments added to the comparison voltage from the channels which are energized after the 200 unit channel.

In an analogous manner, the right-hand input terminals 560 and 557 of lockout unit 551 are connected, respectively, to output terminal 306f of the 80 unit driver 302g and to output terminal 292i of the 20 unit storage trigger 287i. Similarly, another lockout unit 551' (which may be the counterpart of the lockout unit shown in Fig. 15) has its left-hand input terminals 550' and 556' connected, respectively, to the output terminal 306k of the 8 unit driver 302k and to the output terminal 292m of the 2 unit storage trigger 287m. Thus, it will be seen that the system provides for lockout of the 20 unit channel when the 80 unit relay continues closed, and for lockout of the 2 unit channel when the 8 unit relay continues closed.

While there have been shown and described and pointed out the novel features of the invention as applied to a preferred embodiment, it will be understood that various omissions and substitutions and changes in the form and details of the device illustrated and in its operation may be made by those skilled in the art without departing from the spirit of the invention. For example, although the "hundreds" digit is the highest rank decimal digit which can be represented in binary terms by the presently described embodiment, it is evident that by increasing the number of unit channels, the system of the present invention can be adapted to represent a "thousands" decimal digit or decimal digits of even higher rank. Moreover, the system of the present invention may be used to measure quantities of primary interest other than voltage providing that these quantities by suitable transducing manifest themselves as a voltage at the input to the system. For example, if current is the primary quantity of interest, the value of current may be determined by passing the same through a standard value resistance and measuring by the system the voltage across the resistance. As another example, the system is adapted to determine the change in the resistance ratio between two oppositely varying resistance elements (as, say, strain gauges) in series by applying the source voltage "E" across the series combination of the two resistance elements and measuring by the system the voltage at the junction of the two resistance elements. In this case, it will be noted that source voltage "E" need not be well regulated since to obtain the quantity of interest (i. e., resistance ratio) it is only necessary to determine the magnitude of the measured voltage in terms of ratio value (as, say, the ratio, measured voltage magnitude voltage/source voltage magnitude) and any variation in source voltage E, since proportionally affecting both the measured voltage and the translator voltage to which it is compared, will have no effect upon the determination of this ratio value.

Since almost any physical effect (as, say, strain, temperature, pressure, displacement angle, velocity, acceleration, etc.) may be converted by suitable transducer means to an expression of the physical effect in terms of voltage or current or resistance, and since these last-named quantities may be measured as described by the system of the present invention, it will be seen that the present invention is susceptible of a great number of applications in obtaining data concerning physical effects. It is the intention, therefore, to be limited only as indicated by the scope of the following claims.

I claim:

1. In a measuring system wherein an electrical quantity to be measured is compared in opposed relation with an electrical quantity progressively changing by increments in accordance with the concurrent progressively changeable condition of a register means adapted upon completion of measuring to manifest by its then attained condition the value of said quantity to be measured, the improvement with said system comprising, first and second channels adapted to be supplied with an alternating signal component, electric circuit means in said first channel responsive to traversal of a null in the difference between said quantities to provide at an output therefor a modification in a time characteristic of said alternating signal component, and means adapted by comparing the time characteristic of the second channel component with that of the first channel component derived from the output of said electric circuit means to change the then existing condition of said register means in response to the occurrence of said modification.

2. In a measuring system wherein a potential to be measured is compared in opposed relation with a potential progressively changing by increments in accordance with the concurrent progressively changeable condition of a register means adapted upon completion of measuring to manifest by its then attained condition the value of said quantity to be measured, the improvement with said system comprising, first and second channels adapted to be supplied with an alternating signal component, electric circuit means in said first channel responsive to traversal of a null in the difference between said potentials to provide at an output therefor a phase reversal in said alternating signal component, and means adapted by comparing the phase of the second channel component with that of the first channel component derived from the output of said electric circuit means to change the then existing condition of said register means in response to the occurrence of said phase reversal.

3. In a measuring system wherein an electrical quantity to be measured is compared in opposed relation with an electrical quantity progressively changing by increments in accordance with the concurrent progressively changeable condition of a register means adapted upon completion of measuring to manifest by its then attained condition the value of said quantity to be measured, the improvement with said system comprising, first and second channels adapted to be supplied with an alternating signal component, electric circuit means in said first channel responsive to traversal of a null in difference between said quantities to provide at an output therefor a modification in a time characteristic of said alternating signal component passing therethrough and of small order output value, alternating signal amplifier means in said first channel for providing an amplificatoin of the alternating signal component at said output, and means adapted by comparing the time characteristic of said second channel component with that of the first channel amplified component to change the then existing condition of said register means in response to the occurrence of said modification.

4. In a measuring system wherein a potential to be measured is compared in opposed relation with a potential progressively changing by increments in accordance with the concurrent progressively changeable condition of a register means adapted upon completion of measuring to manifest by its then attained condition the value of said quantity to be measured, the improvement with said system comprising, first and second channels adapted to be supplied with an alternating signal component, electric circuit means in said first channel responsive to traversal of a null in the difference between said potentials to provide at an output therefor a reversal in the phase of the alternating signal component passing therethrough and of small order output value, alternating signal amplifying means in said first channel for providing amplification of the alternating signal component at said output, and means adapted by comparing the phase of the second channel component with that of the first channel amplified component to change the then existing condition of said register means in response to the occurrence of said phase reversal.

5. An analog-to-digital converter comprising the combination of a source of variable voltage, a source of stepped voltage having selectably addable steps which in amplitude sequentially diminish in fixed ratio, a source of alternating voltage, first and second channels supplied by said last-named source with said alternating voltage, means for comparing said variable and stepped voltages to provide a difference voltage, means in said first channel for modulating the source supplied alternating voltage therein with said difference voltage, means responsive to inputs of said modulated voltage and of the source supplied alternating voltage in said second channel for rectifying said modulated voltage in synchronism with said second channel alternating voltage to convert a phase reversal of said input modulated voltage into a polarity reversal of said rectified voltage, said phase and polarity reversals occurring upon traversal of a null in the difference between said stepped and variable voltages, means for producing a pulse when said rectified modulated voltage undergoes a change in polarity, means for utilizing said pulses to control said source of stepped voltage as to the next selected value of said stepped voltage, and register means connected with said source of stepped voltage to undergo a progressive change in condition in accordance with the progressive change in said stepped voltage, said register means upon completion of measuring being adapted by its then attained condition to manifest digital values corresponding to the value of said variable voltage.

6. An electrical device comprising, variable impedance means, means for varying in substantially sinusoidal fashion the impedance value of said impedance means, means for applying in opposed relation across said impedance means a potential to be measured and a comparing potential, and means for obtaining as an output of said impedance means an alternating signal component of one or another phase in dependence upon the sense of the difference in potential between said two potentials.

7. An electrical device comprising, resistor means mechanically variable in resistance, transducer means adapted to be driven by an alternating electrical signal to provide a vibration output, mechanical coupling means for varying the resistance of said resistor means in accordance with the vibration output of said transducer means, means for applying in opposed relation across said resistor means a potential to be measured and a comparing potential, and means for obtaining as an output of said resistor means an alternating signal component of one or another phase in dependence upon the sense of the difference in potential between said two potentials.

8. An electrical signal transfer system comprising, means responsive to a D. C. signal and to a reference phase alternating signal for providing an alternating signal component of selectively one and another phase in dependence on the polarity of the D. C. signal, means for amplifying said alternating signal component, synchronous rectifier means responsive to a phase comparison between said amplified component and said reference phase alternating signal for providing a train of output pulses assuming one or another polarity in the presence, respectively, of said one or said other phase of said component, and means for demodulating said pulses to provide a D. C. signal of a polarity determined by that of the pulses demodulated.

9. An electrical signal transfer system comprising, means for comparing a first and a second potential to obtain the difference voltage therebetween, said potentials each normally having a given polarity, means responsive to said difference voltage and to a reference phase alternating signal for providing an alternating signal component of one or another phase in dependence on the sense of the difference voltage, means for amplifying said alternating signal component, synchronous rectifier means responsive to a phase comparison between said amplified component and said reference phase alternating signal for providing a train of output pulses assuming one or another polarity in the presence, respectively, of said one or said other phase of said component, means for demodulating said pulses to provide a D. C. signal of a polarity determined by that of the pulses demodulated, and means responsive to a reversed polarity of said first potential for reversing the polarity of said second potential and for reversing the phase of said alternating signal as supplied to said synchronous rectifier means.

10. A translator circuit organization in the form of a ladder network, comprising a plurality of series impedance branch means on one side of said network, a first output terminal connected to an end of the said impedance means in series, a second terminal on the other side of said network, a plurality of shunt impedance branch means each connected between said second terminal and a different one of the respective junctions between said series impedance means, and means for coupling a source potential of common value for all said shunt branches in circuit with a selected one or ones of said shunt branch means to provide contribution thereby to said output terminals of respective superposable voltages individually representing different predetermined ratio values of said source potential.

11. A translator circuit organization in the form of an impedance network comprising a pair of output terminals, a plurality of impedance branches coupled in series to one terminal, a plurality of shunt impedance branches coupled between said other terminal and said series branches, and a plurality of multiple-condition relay means respectively associated with said shunt branches, each relay means when in one of said conditions being adapted to selectively couple in circuit with its shunt branch a source potential of common value for all said shunt branches, said shunt branches when coupled in circuit with said source potential contributing to said terminals respective superposable voltages representing different predetermined ratio values of said source potential.

12. A translator circuit organization in the form of an impedance network comprising a pair of output terminals, a plurality of impedance branches coupled in a series to one terminal, a terminating impedance branch coupled between the other terminal and said series of impedance branches at the end thereof away from said one terminal, a plurality of shunt impedance branches coupled between said other terminal and respective branch points at series branch ends lying towards said one terminal, and means for coupling in circuit with a selected one or ones of said shunt branches a source potential of common value for all said shunt branches, said aforementioned branches having impedance values providing an iterative network impedance looking towards said terminating branch from a branch point when the impedance of the shunt branch coupled thereto is excluded; the impedance value of said excluded shunt branch equalling said iterative impedance.

13. A translator circuit organization comprising a pair of output terminals, a plurality of resistance branches of value "R" and another resistance branch of value "2R" serially coupled in the order named from one to the other of said output terminals, a plurality of shunt resistance branches of values "2R" coupled between said other terminal and respective series branch ends lying towards said one terminal, and means for coupling in circuit with a selected one or ones of said shunt branches a source potential of common value for all said shunt branches.

14. A translator circuit organization comprising a pair of output terminals, a plurality of resistance branches of value "R" and another resistance branch of value "2R" serially coupled in the order named from one to the other of said output terminals, a plurality of shunt resistance branches of values "2R" coupled between said other terminal and respective series branch ends lying towards said one terminal, and a plurality of multiple-condition relay means respectively associated with said shunt branches, each relay means when in one condition being adapted to couple in circuit with its shunt branch a source potential of common value for all said shunt branches.

15. A translator circuit organization comprising a plurality of electric circuit means respectively adapted upon application of a source potential thereto to provide output voltages having values depending upon the mode of application of the source potential, and a proportioning ladder network having output terminals, series branches and shunt branches formed at least in part, respectively, by said several electric circuit means, said electric circuit means contributing to said terminals respective superposable voltages representing different predetermined ratio values of the output voltages of said electric circuit means.

16. A translator circuit organization comprising a plurality of ladder networks each including a plurality of series branches and a plurality of shunt branches, means for coupling a source potential of common value for all said networks with a selected one or ones of said shunt branches in one or ones of said networks, said shunt branches when so coupled in a given network contributing to the output thereof respective superposable voltages representing different predetermined ratio values of said source potential, and a proportioning ladder network having a plurality of series branches and a plurality of shunt branches formed at least in part by said ladder networks, said proportioning network providing an output voltage representing the superposition of different ratio values of the several ladder network output voltages.

17. A translator circuit organization as in claim 16 wherein the several ladder networks are counterparts and wherein each ladder network sees the same impedance looking into said proportioning network.

18. In a system for manifesting in digital terms the value of an analog voltage to be measured, said system including a plurality of first relay means energized successively to produce an output voltage as a sum of a digital series of analog voltages developed by said successive energizations, said system further including a decision means responsive after each relay means has produced its analog voltage and to the occurrence of a signal representing a difference potential of predetermined sense between said output voltage and said voltage to be measured for deenergizing the last-named relay means before the next is energized, the combination therewith of a second relay means energized before any of said first relay means, means responsive to the energization of said second relay means for reversing the sense of the difference potential required for said decision means to respond, said second relay means being controlled by said decision means to be deenergized thereby only if after said reversal has taken place said decision means responds to said signal, and means responsive to said second relay means for reversing the polarity of said output voltage during continued energization of said second relay means while any of said first relay means are rendered energized.

19. In a system for manifesting in digital terms the value of an analog voltage to be measured, said system including a plurality of relay means energized successively to produce an output voltage as a sum of a digital series of analog voltages developed by said successive energizations, said system further including a decision means responsive after each relay means has produced its analog voltage and to the occurrence of a signal representing a difference potential of predetermined sense between said output voltage and said voltage to be measured for deenergizing the last-named relay means before the next is energized, the combination therewith of lockout means operable so long as a given relay means is energized to prevent energization of another of said relay means normally energized after said given relay means.

20. A circuit adapted for use with analog-to-digital conversion apparatus wherein a translator unit is adapted, when supplied with an energizing voltage and when actuated by signals, to provide an output voltage representing an accumulation of voltage increments each proportional to the energizing voltage and respectively selected by said signals from a succession of said increments which are the analog equivalents to a decreasing binary series, and wherein a decision unit conjointly responds to said output voltage and to an analog voltage to be converted to actuate said translator unit with control signals which select appropriate voltage increments of said translator unit to render said output voltage a closer and closer approximation to said analog voltage, said circuit comprising, a source of voltage, means to supply the voltage from said source to said translator unit as the energizing voltage thereof, first and second impedance means connected to have a common electrical junction, means to couple said first and second impedance means in series with said source, and means coupled to said junction to supply as said analog voltage to said decision unit the fraction of said source voltage appearing as a voltage drop across said first impedance means, the value of said voltage drop relative to that of said source voltage being a measure of the impedance of said first impedance means relative to that of said second impedance means, and said circuit eliminating variations in said source voltage as a parameter in the analog-to-digital conversion of said apparatus to thereby render the digital value obtained by said conversion a reliable digital measure of said relative impedance.

References Cited in the file of this patent

UNITED STATES PATENTS

| | | |
|---|---|---|
| 2,023,221 | Fischer et al. | Dec. 3, 1935 |
| 2,630,481 | Johnson | Mar. 3, 1953 |
| 2,685,084 | Lippel et al. | July 27, 1954 |